(12) United States Patent
Yamamoto

(10) Patent No.: US 8,075,171 B2
(45) Date of Patent: Dec. 13, 2011

(54) LAMP DEVICE

(75) Inventor: Akinori Yamamoto, Kosai (JP)

(73) Assignee: ASMO Co., Ltd., Shizuoka-ken (JP)

( * ) Notice: Subject to any disclaimer, the term of this patent is extended or adjusted under 35 U.S.C. 154(b) by 0 days.

(21) Appl. No.: 12/851,820

(22) Filed: Aug. 6, 2010

(65) Prior Publication Data

US 2011/0044063 A1  Feb. 24, 2011

(30) Foreign Application Priority Data

Aug. 10, 2009 (JP) ................................. 2009-185957
Sep. 18, 2009 (JP) ................................. 2009-217614

(51) Int. Cl.
*F21V 21/14* (2006.01)

(52) U.S. Cl. ........ 362/523; 362/524; 362/528; 362/530; 362/532; 362/538

(58) Field of Classification Search .................. 362/523, 362/524, 528, 530, 531, 532, 538
See application file for complete search history.

(56) References Cited

U.S. PATENT DOCUMENTS

| | | | | |
|---|---|---|---|---|
| 7,175,319 B2 * | 2/2007 | Tajima et al. | .................. | 362/465 |
| 7,556,409 B2 * | 7/2009 | Tatara et al. | .................. | 362/465 |
| 7,621,663 B2 * | 11/2009 | Tajima et al. | .................. | 362/530 |
| 7,635,211 B2 * | 12/2009 | Kusagaya | .................. | 362/526 |
| 7,658,522 B2 * | 2/2010 | Kuwahara et al. | .................. | 362/524 |
| 7,703,954 B2 * | 4/2010 | Kusagaya | .................. | 362/465 |
| 7,815,352 B2 * | 10/2010 | Naganawa et al. | .................. | 362/523 |

FOREIGN PATENT DOCUMENTS

| | | |
|---|---|---|
| JP | 2009-275662 | 10/1997 |
| JP | 3832675 B2 | 10/1997 |
| JP | 2004-203224 | 7/2004 |
| JP | 4226893 B2 | 7/2004 |
| JP | 2005-186731 | 7/2005 |
| JP | 2005-186731 A | 7/2005 |

\* cited by examiner

*Primary Examiner* — Ali Alavi
(74) *Attorney, Agent, or Firm* — Kilpatrick Townsend & Stockton LLP

(57) ABSTRACT

A lamp device is provided that is capable of performing a first actuation and a second actuation. At the first actuation, the lamp device pivots a lamp about a first axis relative to a support, and, at the second actuation, the lamp device pivots the lamp about a second axis, which is perpendicular to the first axis, relative to the support. The lamp includes a first supporting portion that is located on the first axis and at a side of the lamp and a second supporting portion that is located on the first axis and at the other side of the lamp. The first supporting portion is supported by the support to be pivotable about the intersection point of the first axis and the second axis. The second supporting portion is joined to a movable joint member. The movable joint member is supported by the support so as to be movable along a second actuation axis.

14 Claims, 18 Drawing Sheets

LAMP DEVICE

The present invention relates to a lamp device capable of adjusting the direction of emitted light.

BACKGROUND OF THE INVENTION

Conventional lamp devices that can adjust the direction of emitted light include the vehicle lamp device disclosed, for example, in Japanese Laid-Open Patent Publication No. 2005-186731. In accordance with the driving state of the vehicle, the vehicle lamp device of the above publication pivots a lamp about a first axis and a second axis perpendicular to the first axis. By pivoting the lamp about the first axis, the lamp device adjusts the direction of light emitted by the lamp substantially along the horizontal direction. By pivoting the lamp about the second axis, the lamp device adjusts the direction of the light substantially along the vertical direction.

The vehicle lamp device disclosed in the above publication has a bracket for supporting the lamp. The bracket is supported from the rear wall of the body of the lamp by means of two adjuster shafts extending along the front-rear direction of the lamp. The adjuster shafts are used for adjusting the position of the lamp along the front-rear direction so as to change the direction of light upward or downward and leftward or rightward, thereby adjusting the direction of the light to a reference direction. An actuator is fixed to the bottom of the lamp body. The actuator includes a first drive source performing a first actuation and a second drive source performing a second actuation. In the first actuation, the first drive source actuates a first output portion to pivot the lamp about the first axis. In the second actuation, the second drive source actuates a second output portion to pivot the lamp about a second axis. The distal end of the first output portion is joined to a lower portion of the lamp. The second output portion extends along the front-rear direction with its distal end pivotally joined to the rear wall of the lamp body.

In the vehicle lamp device of the above publication, the actuator incorporates both the first drive source and the second drive source, and the actuator pivots the bracket and the lamp in an integral manner about the second axis. Thus, the bracket and the actuator act as a load at the second actuation. Accordingly, the size of the second drive source is increased, which leads to a larger size for the vehicle lamp device and an increased consumption current.

In this vehicle lamp device, the lamp is supported from the rear wall of the lamp body only by three shafts, which are the two adjuster shafts and the shaft of the second output portion. Thus, the lamp is likely to be shaken upward and downward, and leftward and rightward.

SUMMARY OF THE INVENTION

Accordingly, it is an objective of the present invention to provide a lamp device and an actuator that are capable of preventing a drive source from acting as a load, and improving the vibration resistance.

To achieve the above objective and in accordance with one aspect of the present invention, a lamp device is disclosed. The lamp device is capable of performing a first actuation and a second actuation. At the first actuation, the lamp device pivots a lamp about a first axis relative to a support, and, at the second actuation, the lamp device pivots the lamp about a second axis, which is perpendicular to the first axis, relative to the support. The lamp device includes a first actuator and a second actuator. The first actuator is held by the support and used for performing the first actuation. The first actuator includes a first output portion and a first drive source. The first drive source is used for moving the first output portion linearly along a first actuation axis, which is skew to the first axis and intersects the second axis. The second actuator is held by the support and used for performing the second actuation. The second actuator includes a second output portion and a second drive source. The second drive source is used for moving the second output portion linearly along a second actuation axis, which is skew to the second axis and intersects the first axis. The lamp includes a first supporting portion that is located on the first axis and at a side of the lamp and a second supporting portion that is located on the first axis and at the other side of the lamp. The first supporting portion is supported by the support to be pivotable about the intersection point of the first axis and the second axis. The second supporting portion is joined to a movable joint member. The movable joint member is supported by the support so as to be movable along a second actuation axis. The first output portion is joined, on the first actuation axis, to the lamp, so as to be capable of transmitting its own linear motion to the lamp. The first output portion is joined, on the first actuation axis, to the lamp, so as to be capable of transmitting its own linear motion to the lamp.

DESCRIPTION OF THE PREFERRED EMBODIMENTS

A first embodiment of the present invention will now be described with reference to the drawings.

Figure 1:
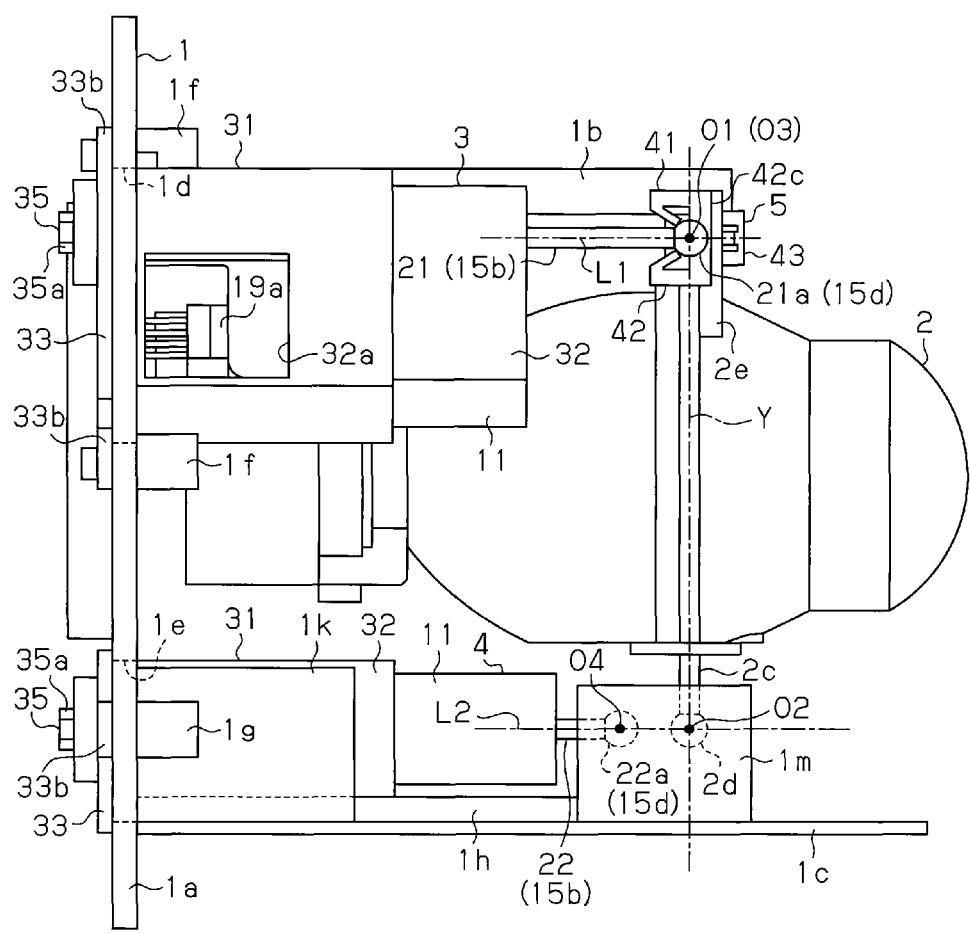
FIG. 1 is a side view illustrating a lamp device according to a first embodiment of the present invention.
Figure 2:
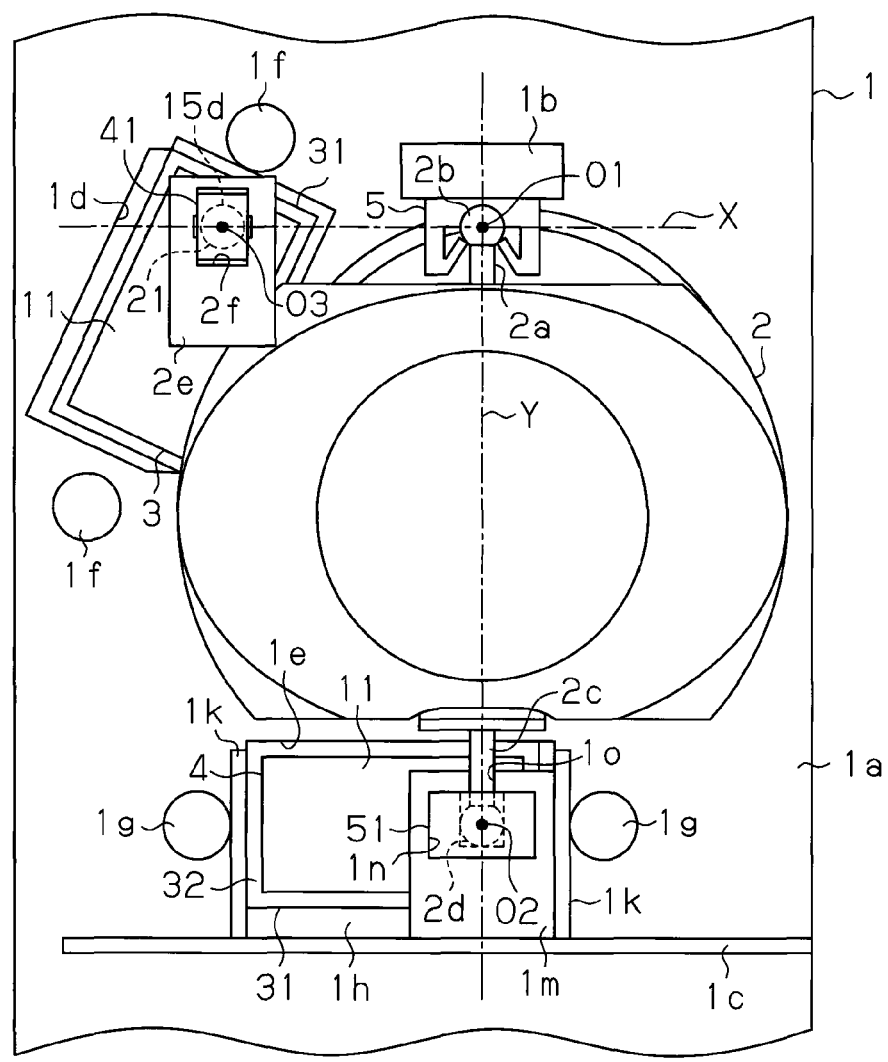
FIG. 2 is a front view of the lamp device shown in FIG. 1.
Figure 3:
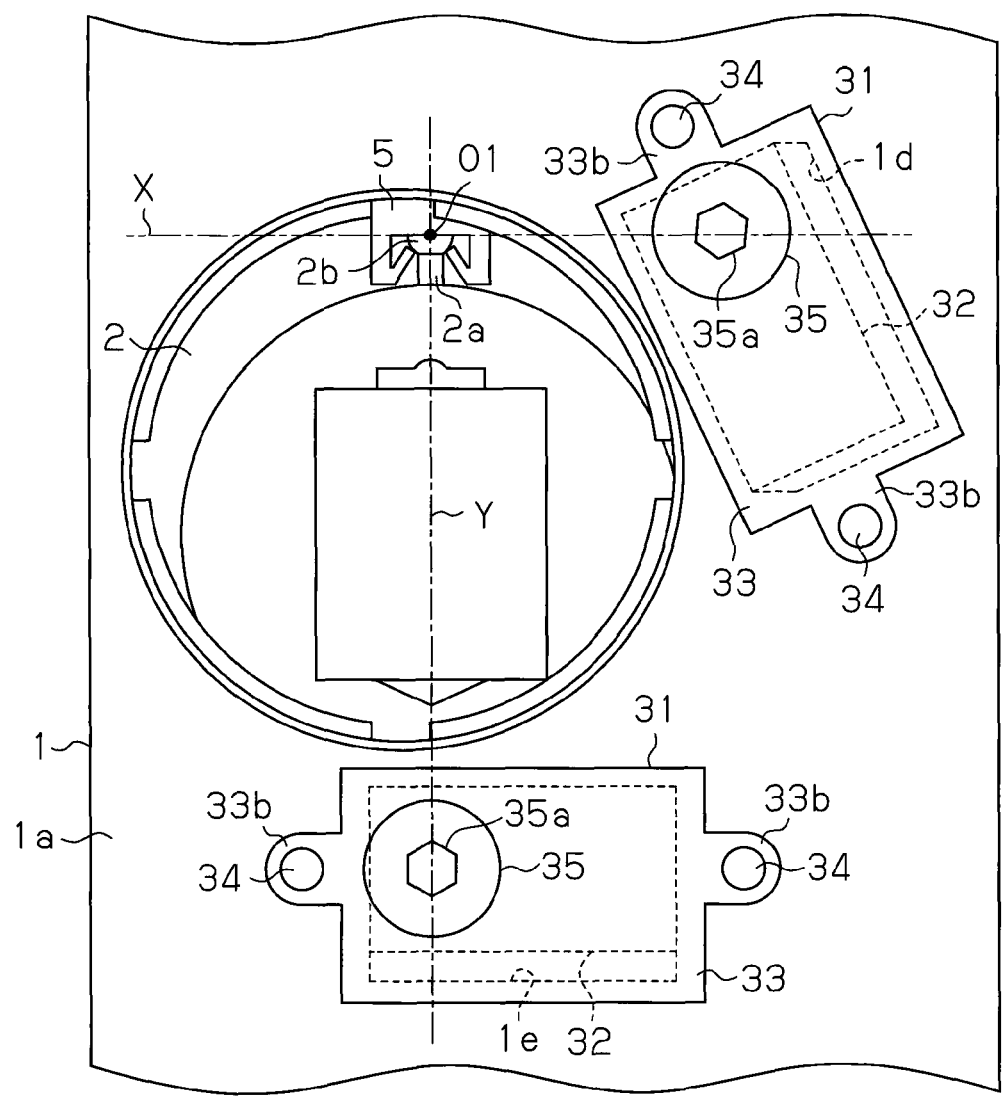
FIG. 3 is a rear view of the lamp device shown in FIG. 1.

As shown in FIG. 1, a lamp device includes a lamp 2 supported by a lamp body 1 (support) of the vehicle, and first and second actuators 3, 4. FIG. 1 is a diagram of the lamp device mounted on the vehicle as viewed from the side (the right side with respect to the forward direction of the vehicle). FIG. 2 is a diagram showing the lamp device as viewed from the front (from the front of the vehicle). FIG. 3 is a diagram showing the lamp device as viewed from the rear (from the rear of the vehicle).

The lamp body 1 includes a rear wall 1a located rearward of the lamp 2, and a post 1b extending forward from the rear wall 1a. The lamp body 1 also has a support plate 1c located below the post 1b. The support plate 1c extends forward form the rear wall 1a and is perpendicular to the up-down direction. As shown in FIG. 2, a supporting member 5 is fixed to the distal end of the post 1b. The supporting member 5 protrudes downward from the post 1b and is formed to pivotally support a first ball portion 2b, which is inserted from the front.

The lamp 2 has a light source (not shown) inside and emits light from the light source to the outside. A columnar first supporting portion 2a projecting upward is formed in a center of the top of the lamp 2. The first ball portion 2b is provided at the distal end of the first supporting portion 2a. The central axis of the first supporting portion 2a coincides with a first axis Y. The first ball portion 2b is inserted into the supporting member 5 from the front in the vehicle (from the front of the elevation of FIG. 2), so that the lamp 2 is suspended from the post 1b by means of the supporting member 5. The lamp 2 is pivotable relative to the lamp body 1 with the center O1 of the first ball portion 2b acting as a fulcrum (pivot center).

A columnar rod-like second supporting portion 2c projecting downward is formed in a center of the bottom of the lamp 2. A second ball portion 2d is provided at the distal end of the second supporting portion 2c. The central axis of the second supporting portion 2c coincides with the first axis Y, and the center O2 of the second ball portion 2d is on the first axis Y, which passes through the center O1 of the first ball portion 2b. A joint support 2e is formed integrally with the lamp 2 at a position on a side (left side as viewed in FIG. 2) of the first supporting portion 2a. The joint support 2e is shaped like an elongated rectangular plate extending in the up-down direction, and has a joint hole 2f extending therethrough in the front-rear direction of the vehicle. When viewed from the front, the joint hole 2f has an elongate shape in the up-down direction.

Figure 4:
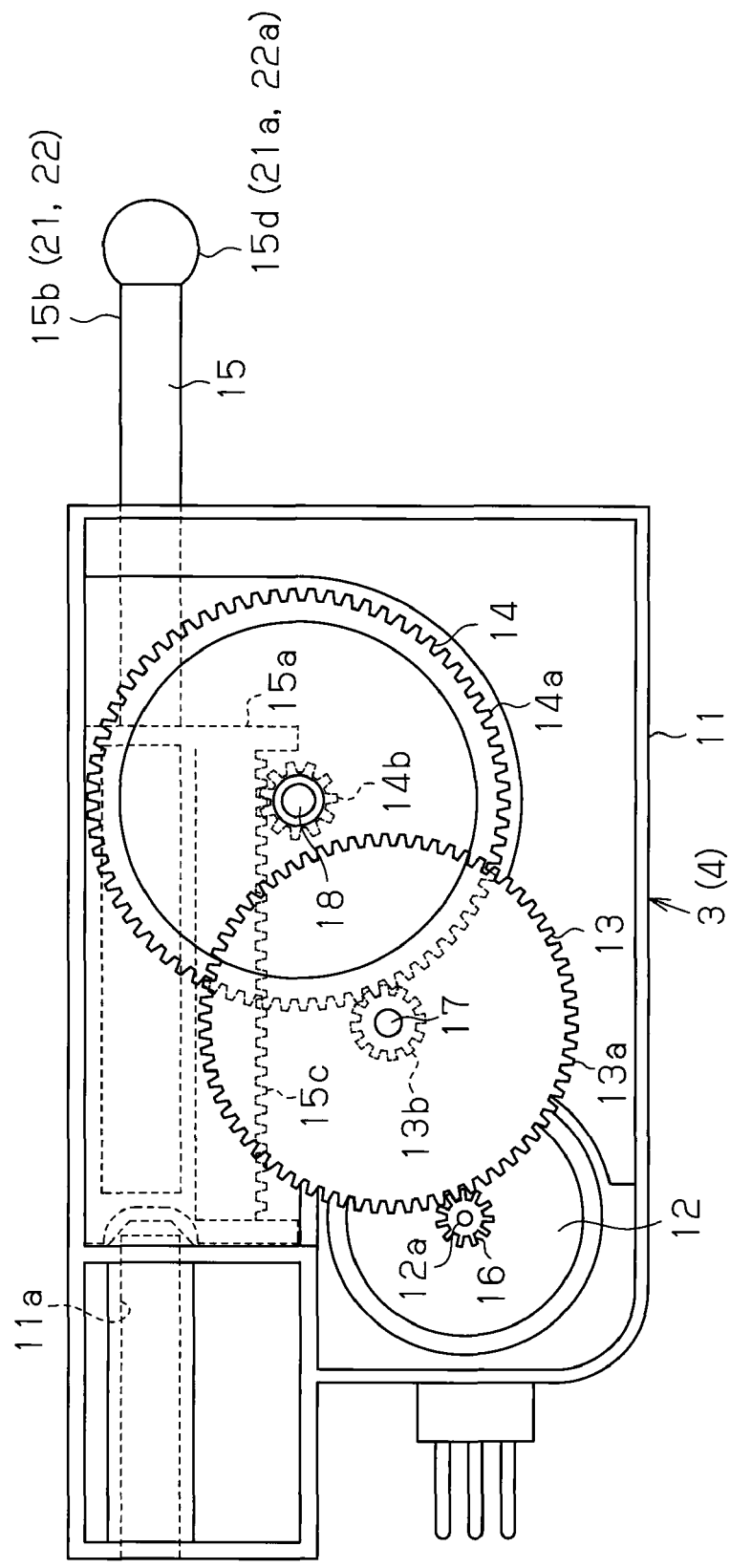
FIG. 4 is a diagram showing an actuator used in the lamp device shown in FIG. 1.

The first and second actuators 3, 4 are fixed to the rear wall 1a. As shown in FIG. 4, the first actuator 3 has a substantially rectangular parallelepiped housing 11, which incorporates a motor 12, a reduction gear member 13, an output gear member 14, and a rack member 15.

A drive gear 16 is fixed to the distal end of a rotary shaft 12a of the motor 12, so as to rotate integrally with the rotary shaft 12a. Inside the housing 11, the reduction gear member 13 is arranged beside the motor 12. The reduction gear member 13 is formed by integrating a disk-like large diameter reduction gear 13a and a disk-like small diameter reduction gear 13b having a smaller diameter than the large diameter reduction gear 13a. The large diameter reduction gear 13a is meshed with the drive gear 16. A first support shaft 17 extends through the center in the radial direction of the reduction gear member 13. The first support shaft 17 is supported by the housing 11, so that the reduction gear member 13 is rotatable about the first support shaft 17.

Inside the housing 11, an output gear member 14 is arranged beside the reduction gear member 13. The output gear member 14 is formed by integrating a disk-like large diameter gear 14a and a disk-like small diameter gear 14b having a smaller diameter than the large diameter gear 14a. The large diameter gear 14a is meshed with the small diameter reduction gear 13b. A second support shaft 18 extends through the center in the radial direction of the output gear member 14. The second support shaft 18 is supported by the housing 11, so that the output gear member 14 is rotatable about the second support shaft 18.

The rack member 15 accommodated in the housing 11 is formed by integrating a substantially rectangular parallelepiped rack 15a and an output shaft 15b, which extends along the longitudinal direction of the rack 15a and serves as an output portion. The rack 15a includes rack teeth 15c, which is meshed with the small diameter gear 14b. The output shaft 15b is columnar and partly protrudes from the housing 11 to the outside. A ball joint portion 15d is provided at the distal end of the output shaft 15b.

An adjusting threaded hole 11a is formed in a part of the housing 11 that is opposite to the side wall through which the output shaft 15b extends. The adjusting threaded hole 11a is an internal thread to which a screw can be threaded from the outside. The adjusting threaded hole 11a extends along a linear actuation direction of the output shaft 15b. Further, a control circuit device (not shown) for controlling the first actuator 3 is accommodated in the housing 11. The control circuit device has a connector portion 19, which is connected to an external connector (not shown) for supplying electricity to the control circuit device. The connector portion 19 protrudes to the outside of the housing 11 beside the adjusting threaded hole 11a.

In the above described first actuator 3, when electricity is supplied from the connector portion 19 so that the motor 12 is driven by the control circuit device, the rotational actuating force of the motor 12 is transmitted to the output gear member 14 from the drive gear 16 through the reduction gear member 13, while being decelerated. The rotational motion of the output gear member 14 is converted into linear motion of the rack member 15 at the rack teeth 15c, which are meshed with the small diameter gear 14b. In accordance with the linear motion of the rack member 15, the output shaft 15b is moved linearly along the axial direction thereof.

Since the second actuator 4 has the same structure as the first actuator 3, the same reference numerals are given to those components that are the same as the corresponding components of the first actuator 3 and detailed explanations are omitted. The motor 12 of the first actuator 3 corresponds to a first drive source, and the output shaft 15b of the first actuator 3 corresponds to a first output portion. The motor 12 of the second actuator 4 corresponds to a second drive source, and the output shaft 15b of the second actuator 4 corresponds to a second output portion. To simplify the description, the output shaft 15b of the first actuator 3 will hereafter be referred to as a first output shaft 21, and the ball joint portion 15d of the first output shaft 21 will be referred to as a first ball joint portion 21a. Also, the output shaft 15b of the second actuator 4 will hereafter be referred to as a second output shaft 22, and the ball joint portion 15d of the second output shaft 22 will be referred to as a second ball joint portion 22a.

Figure 5:
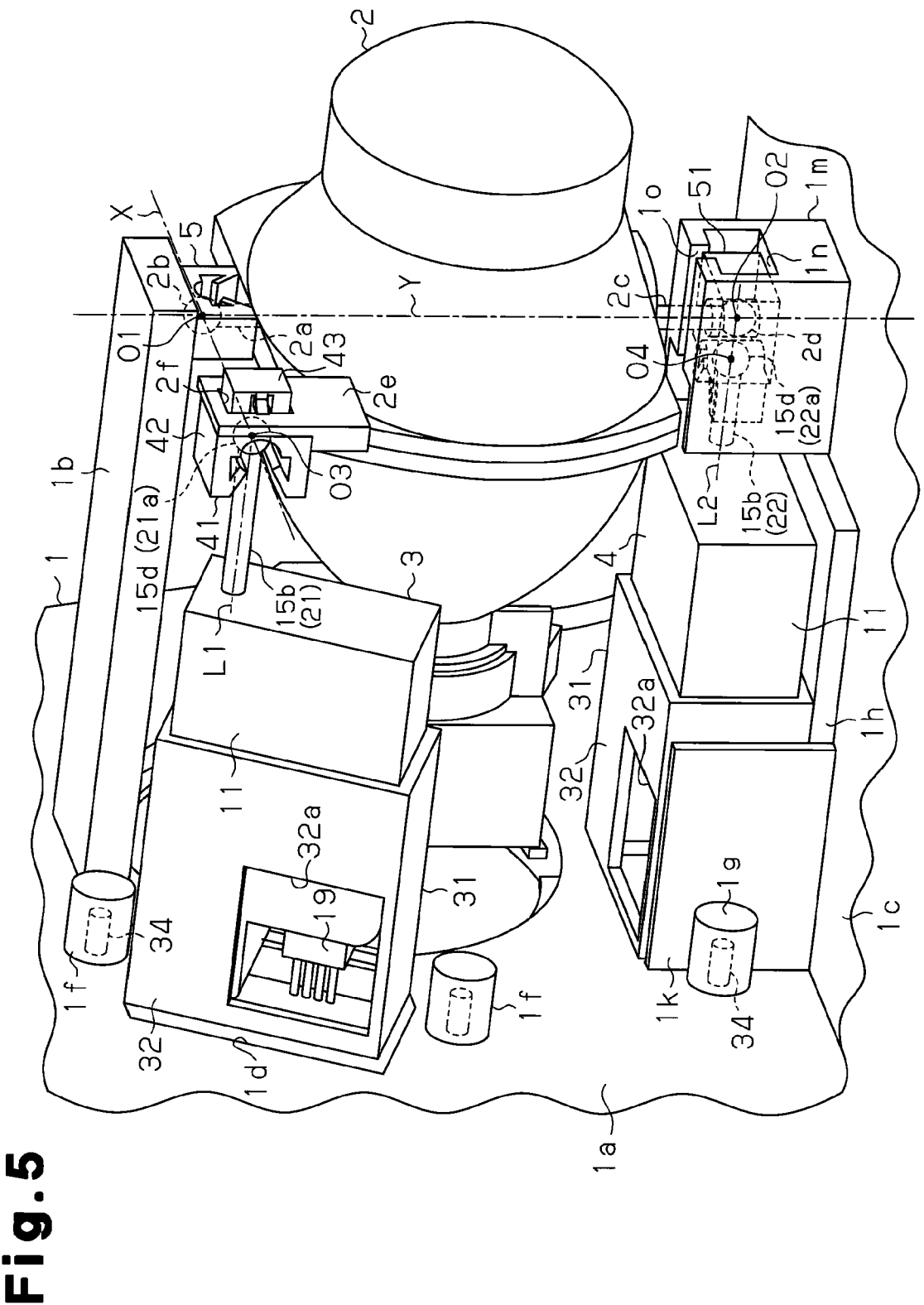
FIG. 5 is a perspective view of the lamp device shown in FIG. 1.
Figure 6:
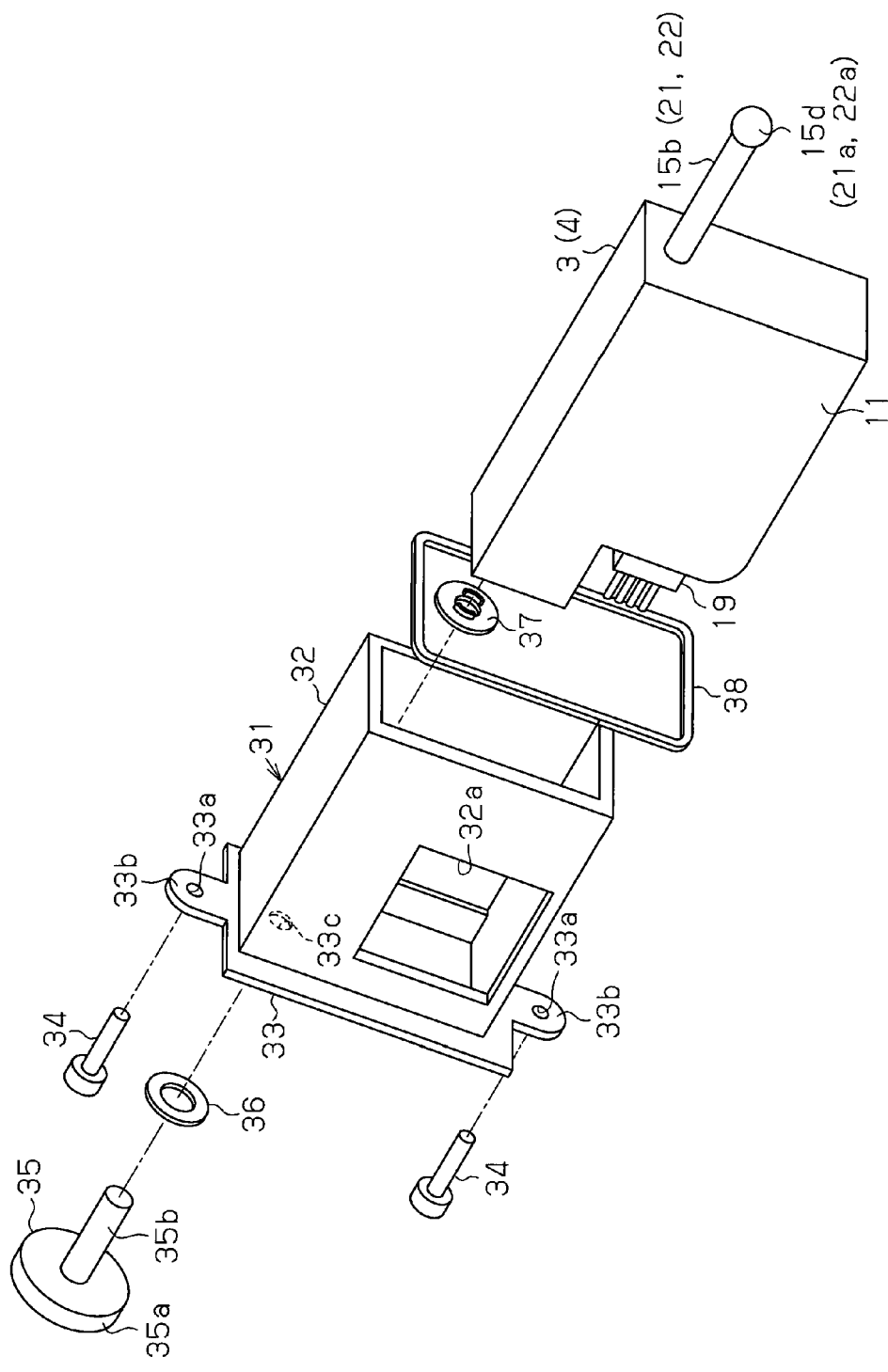
FIG. 6 is an exploded perspective view a fixing device for fixing the actuator shown in FIG. 3.

As shown in FIG. 5, the first and second actuators 3, 4 are each fixed to the lamp body 1 with a corresponding fixing device 31. As shown in FIG. 6, the fixing device 31 includes an accommodation case 32, a fixing plate 33, a pair of fixing screws 34, and an optical axis adjuster bolt 35. The accommodation case 32 has a pair of openings, through which the first actuator 3 (or the second actuator 4) is inserted. The fixing plate 33 closes one of the openings of the accommodation case 32. The optical axis adjuster bolt 35 is supported by the fixing plate 33.

The accommodation case 32 is shaped like a rectangular tube so as to conform to the outer shape of the first actuator 3 (or the second actuator 4), and the distance between the pair of openings is less than the length of the output shaft 15b in the housing 11 of the first actuator 3. An exposing hole 32a is formed in one of the four side walls forming the accommodation case 32. When the first actuator 3 is inserted in the accommodation case 32, the connector portion 19 is exposed to the outside of the accommodation case 32 through the exposing hole 32a.

The fixing plate 33 is a rectangular plate larger than the outer shape of the accommodation case 32. The fixing plate 33 is arranged to close one of the openings of the accommodation case 32. In this state, the periphery of the fixing plate 33 protrudes outward from the outer surface of the accommodation case 32 and forms a flange. An insertion portion 33b extends outward from each end of the fixing plate 33 with respect to the longitudinal direction. Each insertion portion 33b has an insertion hole 33a, through which one of the pair of fixing screws 34 is inserted. Further, the fixing plate 33 has an adjuster hole 33c extending through the thickness of the fixing plate 33. The adjuster hole 33c is located at a position that faces the adjusting threaded hole 11a formed in the housing 11 of the first actuator 3 inserted in the accommodation case 32.

The optical axis adjuster bolt 35 is inserted in the adjuster hole 33c. The optical axis adjuster bolt 35 has a substantially disk-shaped manipulation portion 35a and an external thread 35b, which extends along the axial direction from the center of the manipulation portion 35a in the radial direction. The outer diameter of the manipulation portion 35a is formed to be greater than the inner diameter the adjuster hole 33c, and the outer diameter of the external thread 35b is formed to be substantially equal to the inner diameter of the adjuster hole 33c. The external thread 35b of the optical axis adjuster bolt 35 is inserted into the accommodation case 32 with a seal ring 36 placed between the manipulation portion 35a and the fixing plate 33. The seal ring 36 prevents water from entering the accommodation case 32. An annular fixing ring 37 is press fitted to the proximal portion of the external thread 35b from inside the accommodation case 32, so that the seal ring 36 and the fixing plate 33 are arranged between the fixing ring 37 and the manipulation portion 35a. The seal ring 36 is arranged between the manipulation portion 35a and the peripheral portion of the adjuster hole 33c of the fixing plate 33. In this manner, the optical axis adjuster bolt 35 is assembled to the fixing plate 33. The external threaded hole 35b of the optical axis adjuster bolt 35 is prevented from moving in the axial direction relative to the fixing plate 33 (along the thickness of the fixing plate), while rotation of the external thread 35b along the circumferential direction is permitted with respect to the fixing plate 33. The external thread 35b of the optical axis adjuster bolt 35 is threaded to the adjusting threaded hole 11a formed in the housing 11 of the first actuator 3 in the accommodation case 32. Therefore, when the optical axis adjuster bolt 35 is rotated, the first actuator 3 is moved along the direction of the linear actuation of the first output shaft 21 with respect to the accommodation case 32, while being guided by the accommodation case 32.

A sealing member 38 is arranged on the peripheral portion of the accommodation case 32. The sealing member 38 has a rectangular frame-like shape along the outer periphery of the rectangular shape of the fixing plate 33, and is brought into close contact with a side of the fixing plate 33 facing the accommodation case 32.

As shown in FIG. 1, the first actuator 3, which is fixed to the fixing device 31, is inserted toward the lamp 2 from the outside into a first attachment hole 1d formed in the rear wall 1a of the lamp body 1. The second actuator 4 is inserted toward the lamp 2 from the outside into a second attachment hole 1e formed in the rear wall 1a of the lamp body 1.

When the lamp device is viewed from the rear, the first attachment hole 1d is formed in the rear wall 1a at a position beside the lamp 2 (on the left of the lamp 2 as viewed in FIG. 3), and the second attachment hole 1e is formed at a position below the lamp 2. The first attachment hole 1d and the second attachment hole 1e both have a substantially rectangular shape that is larger than the outer shape of the accommodation case 32 and smaller than the outer shape of the fixing plate 33. Specifically, the first attachment hole 1d is shaped substantially as a rectangle, the longitudinal direction of which is inclined relative to the first axis Y. The measurement of the first attachment hole 1d in the transverse direction is greater than the measurement of the inserted accommodation case 32 in the transverse direction. The second attachment hole 1e is shaped as a rectangle, the longer sides of which extend along the direction of a second axis X. The measurement of the second attachment hole 1e in the transverse direction is greater than the measurement of the inserted accommodation case 32 in the transverse direction.

As shown in FIGS. 1 and 2, a columnar first threaded portion 1f projects forward at either end of the first attachment hole 1d on the rear wall 1a in the longitudinal direction. Also, a second threaded portion 1g projects forward at either end of the second attachment hole 1e in the longitudinal direction. A threaded hole (not shown) is formed in each of the first threaded portion 1f and the second threaded portion 1g. The threaded hole receives from the rear the corresponding fixing screw 34.

As shown in FIGS. 1, 3, and 6, the first actuator 3 is inserted into the first attachment hole 1d from the rear of the rear wall 1a with the fixing plate 33 attached to the rear of the accommodation case 32. Thereafter, with the sealing member 38 placed between the fixing plate 33 and the peripheral portion of the first attachment hole 1d in the rear wall 1a, the pair of fixing screws 34, which are passed through the pair of insertion holes 33a formed in the fixing plate 33, are threaded to the pair of first threaded portion 1f, so that the first actuator 3 is fixed to the lamp body 1 by means of the fixing device 31. Likewise, the second actuator 4 is inserted into the second attachment hole 1e from the rear of the rear wall 1a with the fixing plate 33 attached to the rear of the accommodation case 32. Thereafter, with the sealing member 38 placed between the fixing plate 33 and the peripheral portion of the second attachment hole 1e in the rear wall 1a, the pair of fixing screws 34, which are passed through the pair of insertion holes 33a formed in the fixing plate 33, are threaded to the pair of second threaded portion 1g, so that the second actuator 4 is fixed to the lamp body 1 by means of the fixing device 31.

When the first and second actuators 3, 4 are fixed to the lamp body 1 with the corresponding fixing device 31, the first and second attachment holes 1d, 1e are closed by the corresponding the fixing plate 33 from the rear of the lamp body 1. In this state, the sealing member 38 prevents water from entering the lamp device through the first and second attachment holes 1d, 1e. The first actuator 3 is located beside the post 1b (on the left as viewed in FIG. 2), and the second actuator 4 is located below the lamp 2 and the above the support plate 1c. The first output shaft 21 of the first actuator 3 and the second output shaft 22 of the second actuator 4 both extend in the front-rear direction and moved linearly along the front-rear direction. Further, the first actuator 3 is not rotatable about a central axis L1 (a first actuation axis) of the first output shaft 21 relative to the lamp body 1, and the second actuator 4 is not rotatable about a central axis L2 (a second actuation axis) of the second output shaft 22 relative to the lamp body 1.

As shown in FIG. 1, a base 1h, which is integrated with the support plate 1c, is placed between the accommodation case 32, into which the second actuator 4 is inserted, and the support plate 1c. The base 1h is formed in an area ranging from a position facing the distal end of the accommodation case 32 with respect to the up-down direction to a position facing the end of the housing 11 of the second actuator 4 corresponding to the second output shaft 22 with respect to the up-down direction. The accommodation case 32, into which the second actuator 4 is inserted, is placed on the base 1h. As shown in FIG. 2, a pair of support walls 1k are arranged on both sides of the accommodation case 32, into which the second actuator 4 is inserted, with respect to the second axis X. The pair of support walls 1k is integrally formed with the support plate 1c, and contacts both end faces of the accommodation case 32 with respect to the second axis X. The support walls 1k restrict the movement of the second actuator 4 along the second axis X with respect to the lamp body 1.

Figure 7:
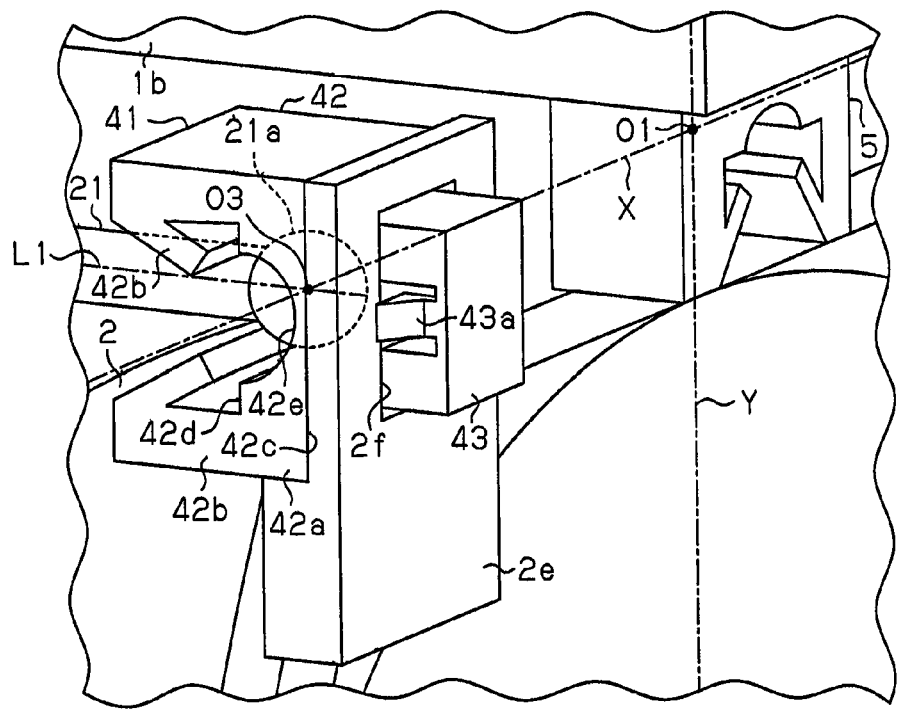
FIG. 7 is a partially enlarged perspective view of the lamp device shown in FIG. 1.

As shown in FIG. 5, the first output shaft 21 of the first actuator 3 supported by the lamp body 1 is joined to the joint support 2e of the lamp 2 with a joint member 41. As shown in FIG. 7, the joint member 41 includes a ball support 42 for supporting the first ball joint portion 21a and a joint insertion portion 43 integrally formed with the ball support 42. The joint insertion portion 43 is inserted into the joint hole 2f of the joint support 2e.

The ball support 42 has a substantially rectangular parallelepiped main body 42a and a pair of support claws 42b. The joint insertion portion 43 projects forward from a flat contact surface 42c (see FIG. 1), which is the front side of the main body 42a. The joint insertion portion 43 is shaped as a rectangular parallelepiped smaller than the main body 42a. The width of the joint insertion portion 43 along the second axis X is substantially equal to the width of the joint hole 2f along the second axis X. The width of the joint insertion portion 43 along the first axis Y (up-down direction) is less than the width of the joint hole 2f along the first axis Y (up-down direction). A pair of snap-fit hooks 43a is formed on both sides of the joint insertion portion 43 with respect to the second axis X. The snap-fit hooks 43a project further outward than both end faces of the joint insertion portion 43 with respect to the second axis X. When receiving pressing force from the outside to the end faces, the hooks 43a can be elastically deformed and retract into the joint insertion portion 43. The joint member 41 is joined to the joint support 2e when the joint insertion portion 43 is inserted into the joint hole 2f of the joint support 2e from the rear so that the snap-fit hooks 43a are engaged with the joint support 2e by snap fit. When the joint insertion portion 43 is inserted in the joint hole 2f of the joint support 2e, the contact surface 42c (see FIG. 1) contacts the joint support 2e, and a clearance along the first axis Y is formed between the inner surface of the joint hole 2f and the joint insertion portion 43. Thus, when the joint insertion portion 43 is moved upward or downward in the joint hole 2f (along the first axis Y), the joint member 41 is moved upward or downward (along the first axis Y) within the range of the joint hole 2f relative to the joint support 2e.

The main body 42a has a support surface 42d on the opposite side to the contact surface 42c, or on the rear side. A support recess 42e recessed forward is formed in the support surface 42d. The support recess 42e is located at the center in the direction along the first axis Y (the up-down direction). When viewed along the second axis X, the shape of the support recess 42e is semicircular with a rearward opening. The support recess 42e extends through the main body 42a along the second axis X. Also, when viewed along the second axis X, the diameter of the support recess 42e is equal to the diameter of the first ball joint portion 21a.

Further, the support claws 42b are integrally formed with the support surface 42d and located at both ends in the direction along the first axis Y (the up-down direction). The support claws 42b extend rearward in parallel from the support surface 42d at both sides with respect to the first axis Y, and then are bent to extend forward. The parts of the support claws 42b that extend forward approach each other toward the front ends. The distance between the distal ends of the support claws 42b is smaller than the diameter of the first ball joint portion 21a, and is equal to or slightly greater than the outer diameter of the first output shaft 21 except the first ball joint portion 21a.

The first ball joint portion 21a is inserted along the second axis X into the space between the inner surface of the support recess 42e and the distal surfaces of the pair of support claws 42b, so that the first output shaft 21 is joined to the joint support 2e on its own central axis L1 by means of the joint member 41. When the first output shaft 21 is joined to the lamp 2 by means of the joint member 41, the distal surfaces of the support claws 42b contact the first ball joint portion 21a from the rear, and the inner surface of the support recess 42e contacts the first ball joint portion 21a from the front. Thus, linear actuating force of the first output shaft 21 is transmitted to the lamp 2 through the joint member 41. Further, the first ball joint portion 21a, which contacts the inner surface of the support recess 42e and the distal surfaces of the support claws 42b, is pivotable in various directions about the center O3 of the first ball joint portion 21a relative to the joint member 41. The joint member 41 is maintained at a position where the center O3 of the first ball joint portion 21a is on the first axis Y, and the central axis L1 of the first output shaft 21 intersects the second axis X, while being skew to the first axis Y.

As shown in FIG. 5, the second output shaft 22 of the second actuator 4 supported by the lamp body 1 is joined to the second supporting portion 2c of the lamp 2 with a movable joint member 51. The movable joint member 51 is supported by a guide 1m above the support plate 1c and forward of the base 1h. The guide 1m accommodates in it the movable joint member 51.

The guide 1m is located below the second supporting portion 2c. The guide 1m is substantially shaped as a rectangular parallelepiped. A guide hole 1n is formed in an upper portion of the guide 1m. The guide hole 1n extends along the direction of the linear actuation of the second output shaft 22, that is, along the central axis L2 of the second output shaft 22 and the vehicle front-rear direction of the vehicle. The guide hole 1n is formed through the guide 1*m* along the direction of the linear actuation direction of the second output shaft 22 and has a rectangular cross section perpendicular to the linear actuation direction of the second output shaft 22. The rear end of the guide hole 1*n* is opened upward. Also, a guide groove 1*o* is formed in the guide 1*m* at a position above the guide hole 1*n*. The guide groove 1*o* connects the guide hole 1*n* with the outside. The guide groove 1*o* extends along the linear actuation direction of the second output shaft 22 and has a width that is equal to or slightly greater than the outer shape of the second supporting portion 2*c* except the second ball portion 2*d*.

Figure 8:
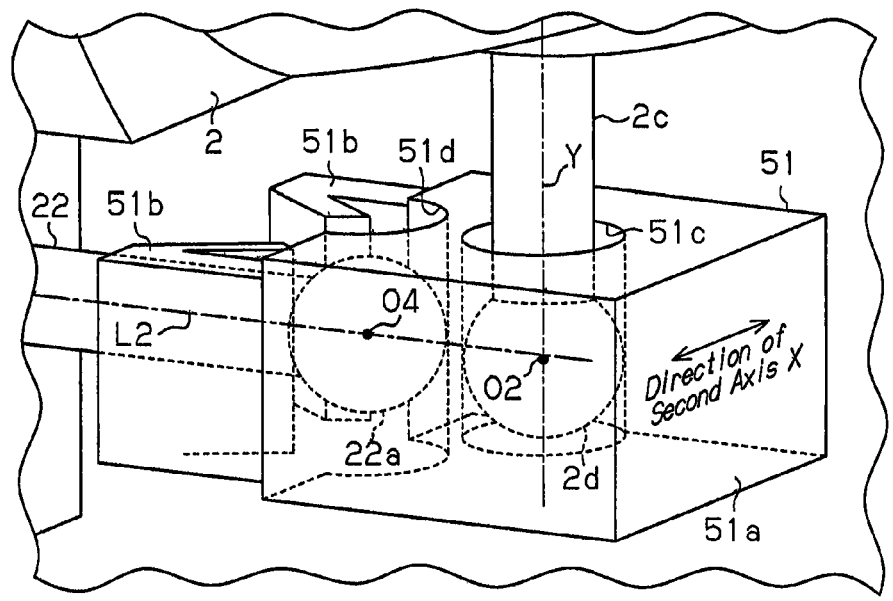
FIG. 8 is a partially enlarged perspective view of the lamp device shown in FIG. 1.

As shown in FIGS. 5 and 8, the movable joint member 51 is inserted into the guide hole 1*n*. The movable joint member 51 has a slide main body 51*a* and a pair of support claws 51*b* formed integrally with the slide main body 51*a*. The slide main body 51*a* corresponds to the guide hole 1*n* and is shaped substantially as a rectangular parallelepiped.

An upward joint hole 51*c* is formed substantially in the center of the slide main body 51*a*. When viewed from above, the joint hole 51*c* is circular. The inner diameter of the joint hole 51*c* is equal to or slightly greater than the diameter of the second ball portion 2*d* of the second supporting portion 2*c*. The depth of the joint hole 51*c* is greater than the diameter of the second ball portion 2*d*.

A support recess 51*d* similar to the support recess 42*e* of the joint member 41 (see FIG. 7) is formed on the rear end face, or the surface facing the second actuator 4, of the slide main body 51*a*. The support recess 51*d* is formed in the center of the rear end face of the slide main body 51*a* with respect to the second axis X, and recessed forward. When viewed along the first axis Y, the shape of the support recess 51*d* is semicircular. The support recess 51*d* extends through the slide main body 51*a* along the first axis X (the up-down direction). Further, when viewed along the first axis Y, the diameter of the support recess 51*d* is equal to the diameter of the second ball joint portion 22*a*.

The support claws 51*b* are integrally formed with the rear end face the slide main body 51*a*. The support claws 51*b* have the same shape as the support claws 42*b* of the joint member 41 (see FIG. 7). That is, the support claws 51*b* extend rearward in parallel from the rear end face of the slide main body 51*a* at both sides with respect to the second axis X, or from both sides with respect to the second axis X of the support recess 51*d*, and then are bent to extend forward. The parts of the support claws 51*b* that extend forward approach each other toward the front ends along the second axis X. The distance between the distal ends of the support claws 51*b* is smaller than the diameter of the second ball joint portion 22*a*, and is equal to or slightly greater than the outer diameter of the second output shaft 22 except the second ball joint portion 22*a*.

As shown in FIGS. 5 and 8, the second ball portion 2*d* at the distal end of the second supporting portion 2*c* is inserted into joint hole 51*c*. The second supporting portion 2*c* is thus joined to the movable joint member 51, while being pivotable about the center O2 of the second ball portion 2*d* within the joint hole 51*c*. Further, the movable joint member 51 is inserted into the guide hole 1*n* from the front with the second ball portion 2*d* of the second supporting portion 2*c* inserted in the joint hole 51*c*. At this time, the columnar part of the second supporting portion 2*c* except the second ball portion 2*d* is inserted into the guide groove 1*o* from the front. Since the diameter of the second ball portion 2*d* is greater than the width of the guide groove 1*o*, the guide 1*m* prevents the second supporting portion 2*c* from coming off the movable joint member 51. Further, the outer surface of the movable joint member 51 slidably contacts the inner surface forming the guide hole 1*n*. The movable joint member 51 is held by the guide 1*m* to be slidable in the vehicle front-rear direction along the linear actuation direction of the second output shaft 22, that is, along the central axis L2 of the second output shaft 22. At the same time, the movable joint member 51 is prevented from moving along the second axis X. The support claws 51*b*, which are located in the rear of the movable joint member 51, are exposed to the outside through an upward opening in the rear end of the guide hole 1*n*.

The second output shaft 22 is joined to the support claws 51*b* of the movable joint member 51 held by the guide 1*m*, so as to be pivotable about the center O4 of the second ball joint portion 22*a*. The second ball joint portion 22*a* is inserted between the inner surface of the support recess 51*d* and the distal surfaces of the support claws 51*b*, so that the second output shaft 22 is joined to the movable joint member 51 on the central axis L2 and joined to the lamp 2 by means of the movable joint member 51. With the second output shaft 22 joined to the lamp 2 by means of the movable joint member 51, the distal surfaces of the support claws 51*b* contact the second ball joint portion 22*a* from the rear, and the inner surface of the support recess 51*d* contacts the second ball joint portion 22*a* from the front. Thus, linear actuating force of the second output shaft 22 is transmitted to the lamp 2 through the movable joint member 51. Further, the second ball joint portion 22*a*, which contacts the inner surface of the support recess 51*d* and the distal surfaces of the support claws 51*b*, is pivotable about the center O4 of the second ball joint portion 22*a* relative to the movable joint member 51. The movable joint member 51 maintains a state in which the first axis Y intersects the central axis L2 of the second output shaft 22, which passes through the center O4 of the second ball joint portion 22*a* and extends along the linear actuation direction of the second output shaft 22. That is, the central axis L2 of the second output shaft 22 is skew to the second axis X, and intersects the first axis Y.

As shown in FIG. 2, the position at which the lamp 2 is pivotally supported by the lamp body 1 is the center O1 of the first ball portion 2*b*. The position at which the lamp 2 is joined to the second output shaft 22 by means of the movable joint member 51 is the center O2 of the second ball portion 2*d*. The straight line connecting the center O1 of the first ball portion 2*b* and the center O2 of the second ball portion 2*d* is the first axis Y. The position at which the first output shaft 21 is joined to the lamp 2 by means of the joint member 41 is the center O3 of the first ball joint portion 21*a*. The straight line connecting the center O1 of the first ball portion 2*b* and the center O3 of the first ball joint portion 21*a* is the second axis X. The first axis Y is perpendicular to the second axis X.

An operation of the above described lamp device will now be described.

For example, when the motor 12 is driven in the first actuator 3 in accordance with the driving condition (attitude) of the vehicle, so that the first output shaft 21 is actuated linearly, the linear actuating force is transmitted to the lamp 2. Accordingly, the lamp 2 is pivoted about the first axis Y (first actuation). This changes and adjusts the direction of light emitted by the lamp 2 substantially in the horizontal direction.

Also, when the motor 12 is driven in the second actuator 4 in accordance with the driving condition (attitude) of the vehicle, so that the second output shaft 22 is actuated linearly, the linear actuating force is transmitted to the lamp 2. Accordingly, the lamp 2 is pivoted about the second axis X (second actuation). This changes and adjusts the direction of light emitted by the lamp 2 substantially in the vertical direction. At this time, as the lamp 2 is pivoted about the second axis X, the second ball portion 2d below the lamp 2 is moved upward or downward in the joint hole 51c, along the axis of the joint hole 51c. As the lamp 2 is pivoted about the second axis X, the joint support 2e of the lamp 2 is moved upward or downward relative to the joint member 41, that is, the joint support 2e is moved in a direction perpendicular to the second axis X and the central axis L1 of the first output shaft 21. However, since the joint insertion portion 43 of the joint member 41 is allowed to move upward or downward in the joint hole 2f formed in the joint support 2e, the joint support 2e is allowed to move upward or downward relative to the joint member 41.

For example, prior to shipment or during maintenance (car inspection), the lamp device allows the axis adjuster bolt 35 of the fixing device 31 to be rotated, so that the optical axis of the lamp 2 to be adjusted (reference position adjustment).

That is, the distal portion of the optical axis adjuster bolt 35 is threaded into the adjusting threaded hole 11a of the first actuator 3. Therefore, when the optical axis adjuster bolt 35 of the fixing device 31, which supports the first actuator 3 to the lamp body 1, is rotated, the first actuator 3 is moved along the central axis L1 of the first output shaft 21, or along the linear actuation direction of the first actuator 3, while being guided by the accommodation case 32 through the threading effect. Then, the lamp 2, which is joined to the distal portion of the first output shaft 21 of the first actuator 3 by means of the joint member 41, is pivoted about the first axis Y, so that the optical axis of the lamp 2 is adjusted in the horizontal direction (left-right direction).

Likewise, the distal portion of the optical axis adjuster bolt 35 is threaded into the adjusting threaded hole 11a of the second actuator 4. Therefore, when the optical axis adjuster bolt 35 of the fixing device 31, which supports the second actuator 4 to the lamp body 1, is rotated, the second actuator 4 is moved along the central axis L2 of the second output shaft 22, or along the linear actuation direction of the second actuator 4, while being guided by the accommodation case 32 through the threading effect. Then, the lamp 2, which is joined to the distal portion of the second output shaft 22 of the second actuator 4 by means of the movable joint member 51, is pivoted about the second axis X, so that the optical axis of the lamp 2 is adjusted in the vertical direction (up-down direction).

The lamp device allows the first and second actuators 3, 4 to be removed from the rear of the lamp body 1 when replacement or maintenance is required.

Figure 9A:
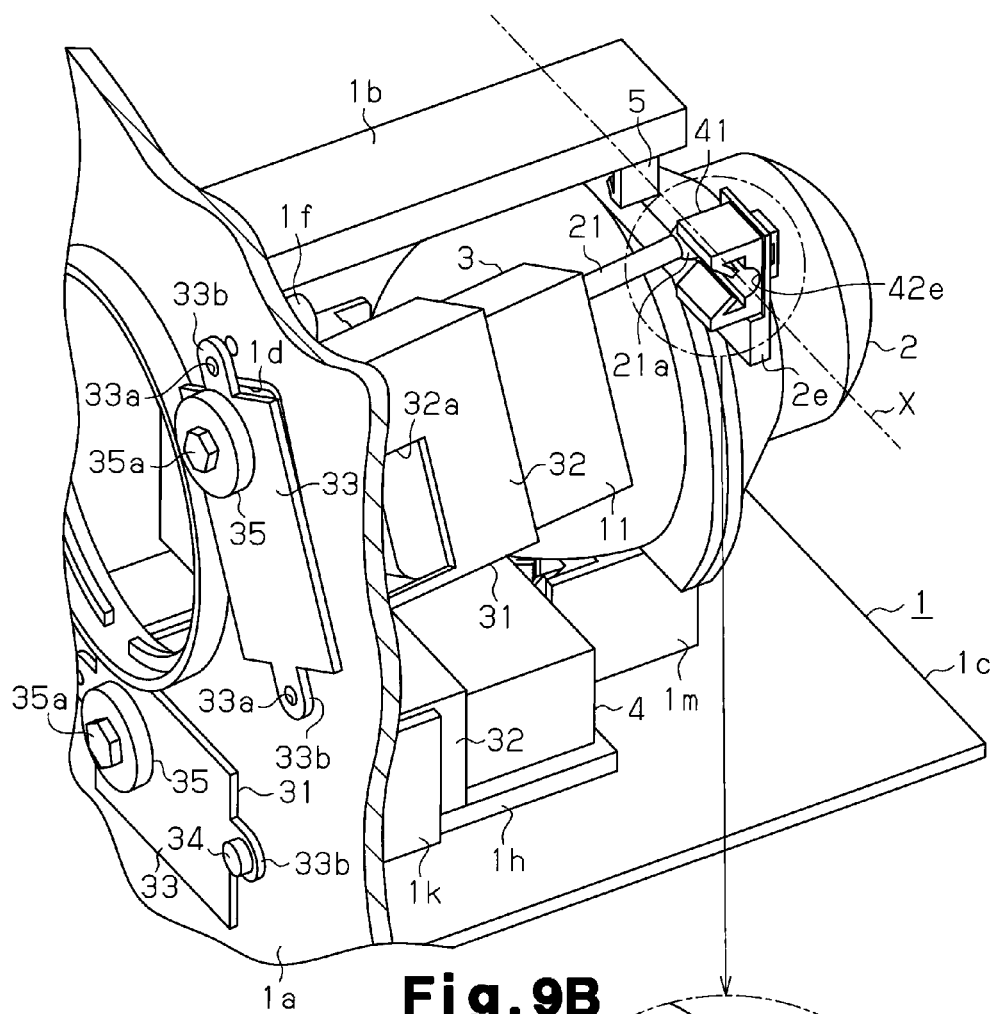
FIG. 9A is a perspective view of the lamp device shown in FIG. 1.
Figure 9B:
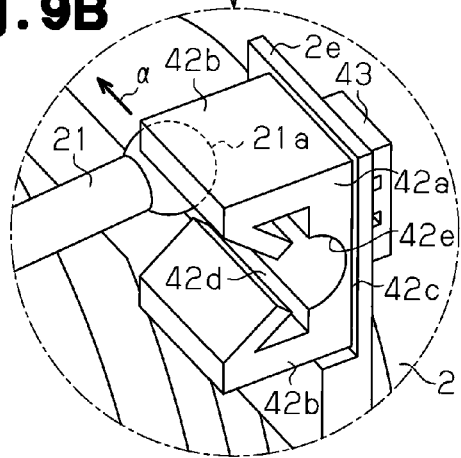
FIG. 9B is an enlarged perspective view of the part surrounded by circle 5B in FIG. 9A.
Figure 11A:
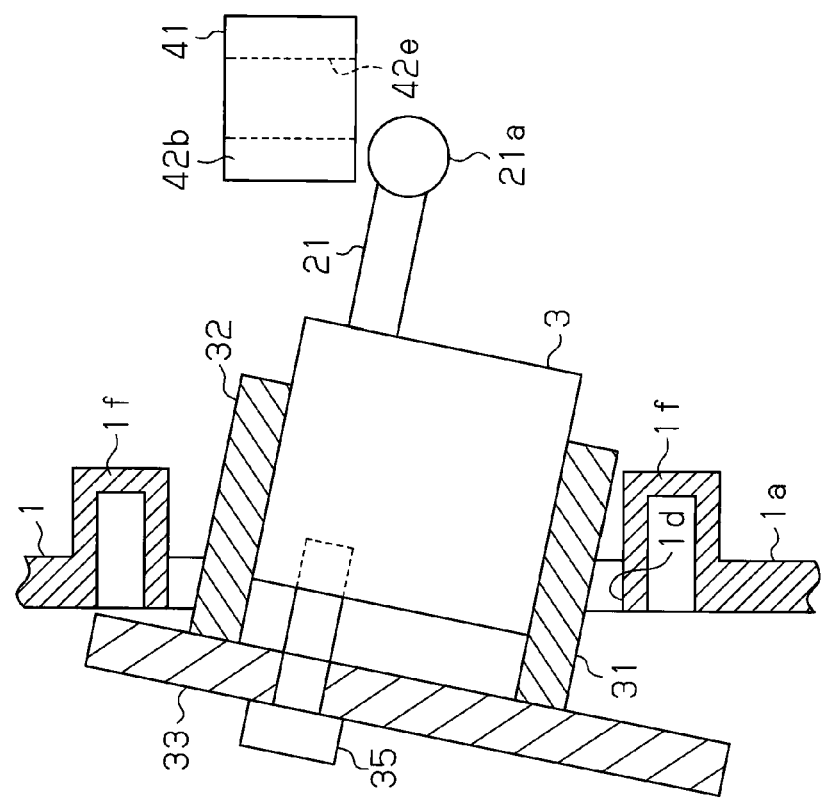
FIG. 11A is a diagram of the lamp device, illustrating the actuator and its surroundings.
Figure 11B:
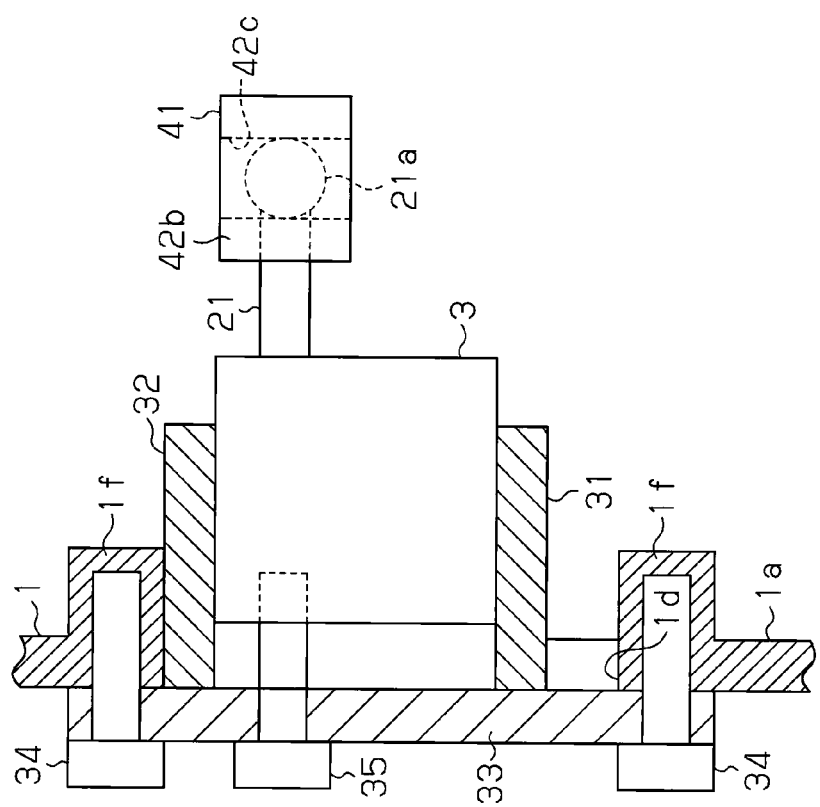
FIG. 11B is a diagram of the lamp device, illustrating removal of the actuator from the lamp device.

After the pair of fixing screws 34 are removed from the rear wall 1a of the lamp body 1, the fixing device 31 is moved horizontally such that the first ball joint portion 21a is moved along the second axis X relative to the joint member 41 (in the direction of arrow α in FIG. 9B) as shown in FIGS. 9A and 9B. This removes the distal portion of the first output shaft 21 from the joint member 41. That is, the first output shaft 21 is released from the lamp 2. At this time, since the first attachment hole 1d formed in the rear wall 1a of the lamp body 1 is larger along the second axis X than the outer shape of the accommodation case 32 as shown in FIGS. 11A and 11B, the first actuator 3 fixed to the fixing device 31 is easily inclined. The first actuator 3 is moved rearward from the first attachment hole 1d together with the fixing device 31, and removed.

Figure 10A:
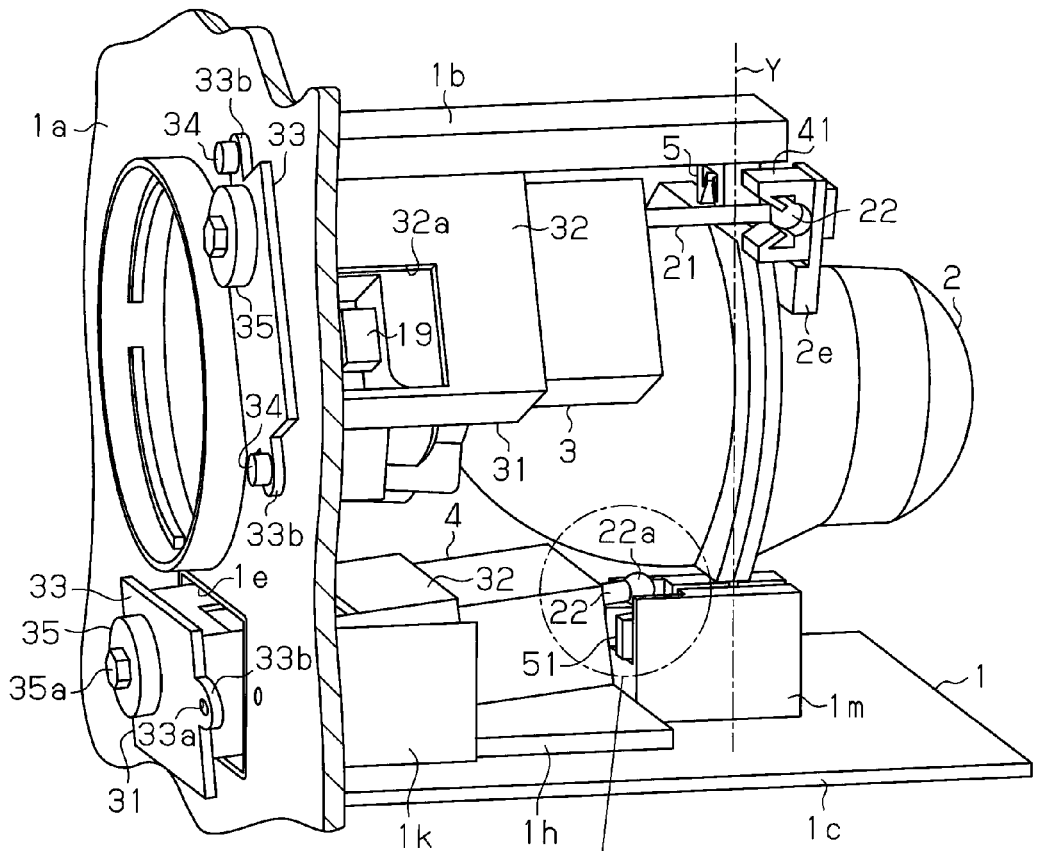
FIG. 10A is a perspective view of the lamp device.
Figure 10B:
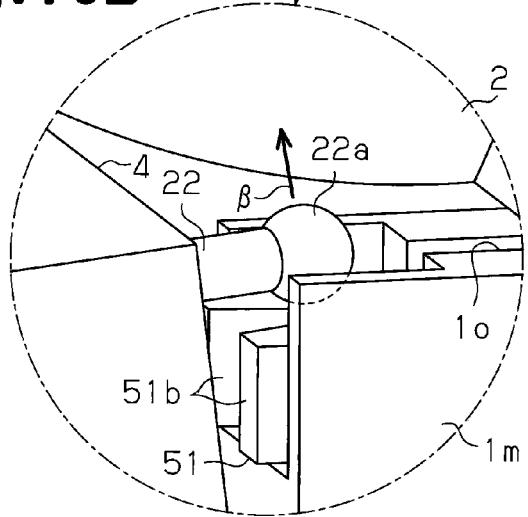
FIG. 10B is an enlarged perspective view of the part surrounded by circle 10B in FIG. 10A.

Likewise, after the pair of fixing screws 34 are removed from the rear wall 1a of the lamp body 1, the fixing device 31 is moved vertically such that the second ball joint portion 22a is moved to the side opposite to the support plate 1c (upward) along the first axis Y relative to the movable joint member 51 (in the direction of arrow β in FIG. 10B) as shown in FIGS. 9A and 9B. This removes the distal portion of the second output shaft 22 from the joint member 51. That is, the second output shaft 22 is released from the lamp 2. At this time, since the second attachment hole 1e formed in the rear wall 1a of the lamp body 1 is larger along the first axis Y than the outer shape of the accommodation case 32, the second actuator 4 fixed to the fixing device 31 is easily inclined. The second actuator 4 is moved rearward from the second attachment hole 1e together with the fixing device 31, and removed.

When fixing the first and second actuators 3, 4 to the lamp body 1, a reverse procedure is performed for removal of the first and second actuators 3, 4 from the lamp body. That is, the first actuator 3 holding the fixing device 31 is inserted forward from the first attachment hole 1d. Thereafter, the first ball joint portion 21a is inserted along the second axis X between the distal surfaces of the pair of support claws 42b of the joint member 41 and the inner surface of the support recess 42e, so that the first output shaft 21 is joined to the lamp 2 by mean of the joint member 41. Also, the second actuator 4 holding the fixing device 31 is inserted forward from the second attachment hole 1e. Thereafter, the second ball joint portion 22a is inserted along the first axis Y (from above) between the distal surfaces of the pair of support claws 51b of the movable joint member 51 and the inner surface of the support recess 51d (see FIG. 8), so that the second output shaft 22 is joined to the lamp 2 by mean of the joint member 51.

The present embodiment provides the following advantages.

(1) When the first output shaft 21 is actuated linearly along the central axis L1 by the actuating force of the motor 12 of the first actuator 3, the linear actuating force is transmitted to the lamp 2, so that the lamp 2 is pivoted about the first axis Y. In other words, the first actuation is performed. Also, when the second output shaft 22 is actuated linearly along the central axis L2 by the actuating force of the motor 12 of the second actuator 4, the linear actuating force is transmitted to the lamp 2 by means of the movable joint member 51, so that the lamp 2 is pivoted about the second axis X. In other words, the second actuation is performed. Since first actuator 3 and the second actuator 4, each of which has the motor 12, is held by the lamp body 1, the actuators 3, 4 do not act as a load at the first actuation or the second actuation. The first supporting portion 2a and the second supporting portion 2c are located on both sides of the first axis Y with the lamp 2 in between. The first supporting portion 2a is supported by the post 1b of the lamp body 1. The second supporting portion 2c is joined to the movable joint member 51 held by the lamp body 1. The lamp 2 is therefore prevented from being shaken relative to the lamp body 1 along the first axis Y and the second axis X. Since the lamp 2 is joined to the output shafts 15b of the first and second actuators 3, 4 fixed to the rear wall 1a behind the lamp 2, the lamp 2 is prevented from being shaken relative to the lamp body 1 along the front-rear direction of the vehicle. Accordingly, the first and second actuators 3, 4 do not act as loads on the motors 12, and the vibration resistance is improved. Further, since the lamp 2 is supported from the lamp body 1 by means of the first and second supporting portions 2a, 2c of the lamp 2, no lamp bracket is required, unlike the prior art devices. This reduces the manufacturing costs.

(2) The movable joint member 51, to which the second supporting portion 2c is joined, is prevented from moving along the second axis X by the guide 1m of the lamp body 1. Therefore, the lamp 2 is easily prevented from being shaken along the second axis X. This further improves the vibration resistance with respect to the second axis X.

(3) At the second actuation, the lamp 2 is pivoted about the second axis X. Thus, the second ball portion 2d at the distal end of the second supporting portion 2c is moved in the joint hole 51c upward or downward along the axis of the joint hole 51c, as the lamp 2 is pivoted. Since the movable joint member 51 allows the second supporting portion 2c to move relative to the movable joint member 51 at the second actuation, the second supporting portion 2c and the second output shaft 22 are smoothly moved relative to each other at the second actuation.

(4) The second supporting portion 2c is easily joined to the movable joint member 51 by being inserted into the joint hole 51c. The movable joint member 51 allows the second supporting portion 2c to move at the second actuation by means of the simple structure, or the joint hole 51c.

(5) When joined to the joint member 41, the first output shaft 21 is allowed to pivot in various directions. That is, the first output shaft 21 and the joint member 41 form a universal joint. Therefore, the joint member 41 is moved smoothly as the first output shaft 21 is moved at the first actuation. When the lamp 2 is pivoted about the second axis X at the second actuation, the joint support 2e is moved (upward or downward) relative to the first output shaft 21. That is, the joint support 2e is moved relative to the joint member 41 along a direction perpendicular to the second axis X and the central axis L1 of the first output shaft 21. Therefore, when the joint member 41 is moved relative to the lamp 2 in a direction perpendicular to the second axis X and the central axis L1 of the first output shaft 21, the joint member 41 is allowed to move relative to the lamp 2 at the second actuation. Thus, the first output shaft 21 is moved smoothly at the second actuation.

(6) Prior to shipment or during maintenance, the pivot position of the lamp 2 about the first axis Y can be adjusted to a reference position by adjusting the position of the first actuator 3 along a direction along the linear actuation direction of the first output shaft 21. Also, the pivot position of the lamp 2 about the second axis X can be adjusted to a reference position by adjusting the position of the second actuator 4 along a direction along the linear actuation direction of the second output shaft 22. Accordingly, the direction of light emitted by the lamp 2 is easily adjusted to the reference position independently in the horizontal direction and the vertical direction. Particularly, when adjustment is executed simultaneously along the horizontal direction and the vertical direction, the adjustment is facilitated.

(7) When releasing the second output shaft 22 from the movable joint member 51, the second actuator 4 is inclined such that the second output shaft 22 is moved in one direction (upward in the present embodiment) that is perpendicular to the central axis L2 of the second output shaft 22. The second attachment hole 1e, which is formed in the rear wall 1a of the lamp body 1, is formed to be larger than the accommodation case 32, into which the second actuator 4 is inserted, so as to allow the second actuator 4 to incline to release the second output shaft 22 from the movable joint member 51. Therefore, the second actuator 4 can be inclined while being inserted in the second attachment hole 1e. In general, if the actuator cannot be removed from the rear of the lamp body, the transparent cover fixed to the front face of the lamp body is removed so as to remove the actuator from the front. The removal of the actuator is therefore troublesome. According to the lamp device of the present embodiment, the second actuator 4 is easily removed from the rear of the lamp 2, so that the maintenance and replacement of the second actuator 4 are performed easily.

(8) When releasing the first output shaft 21 from the lamp 2, the first actuator 3 is inclined such that the first output shaft 21 is moved in one direction (rightward as viewed from the rear of the lamp device in the present embodiment) that is perpendicular to the central axis L1 of the first output shaft 21. The first attachment hole 1d, which is formed in the rear wall 1a of the lamp body 1, is formed to be larger than the accommodation case 32, into which the first actuator 3 is inserted, so as to allow the first actuator 3 to incline to release the first output shaft 21 from the lamp 2. Therefore, the first actuator 3 can be inclined while being inserted in the first attachment hole 1d. Therefore, the first actuator 3 can be easily removed from the rear of the lamp 2, so that the maintenance and replacement of the first actuator 3 are performed easily.

(9) The accommodation cases 32 each have the exposing hole 32a for exposing the connector portion 19 of the inserted first or second actuator 3, 4. Thus, the external connector can be connected to or disconnected from the connector portion 19 with the first and second actuators 3, 4 inserted in the accommodation case 32. Therefore, the replacement and maintenance of the first and second actuators 3, 4 are performed easily.

(10) The accommodation cases 32 are formed separately from the lamp body 1, instead of being integrated with the lamp body 1. Therefore, compared to a case where accommodation cases 32 are formed integrally with a large lamp body 1, the present embodiment reliably ensures high dimensional accuracy of the distal portions of the output shafts 15b of the first and second actuators 3, 4 held by the accommodation case 32.

The preferred embodiment of the present invention may be modified as follows.

In the present embodiment, the first actuator 3 and the second actuator 4 are each fixed to the rear wall 1a of the lamp body 1 by means of the fixing device 31. However, the first actuator 3 and the second actuator 4 may be attached to the lamp body 1 in any suitable manners. For example, the accommodation case 32 may be integrally formed with the lamp body 1, and the accommodation case 32 does not necessarily require the fixing device 31. Also, the first actuator 3 and the second actuator 4 may be fixed to the lamp body 1 with, for example, screws.

In the above described embodiment, when the first ball joint portion 21a at the distal end of the first output shaft 21 is moved along the second axis X relative to the joint member 41, the first output shaft 21 is disengaged from the joint member 41 so as to be released from the lamp 2. This configuration may be changed as long as the first output shaft 21 is disengaged from the joint member 41 when the first output shaft 21 is moved in one direction perpendicular to the central axis L1 of the first output shaft 21. In this case, the orientation of the joint member 41 and the shape of the first attachment hole 1d are changed in accordance with the direction in which the first output shaft 21 is moved when disengaged from the joint member 41. Likewise, the configuration of the second output shaft 22 may be changed as long as the second output shaft 22 is disengaged from the movable joint member 51 when the second output shaft 22 is moved in one direction perpendicular to the central axis L2 of the second output shaft 22. In this case, the orientation of the pair of support claws 51b and the support recess 51d and the shape of the second attachment hole 1e are changed in accordance with the direction in which the second output shaft 22 is moved when disengaged from the movable joint member 51.

In the above described embodiment, the positions of the output shafts 15b of the first and second actuators 3, 4 in the direction of the linear actuation can be adjusted by rotating the optical axis adjuster bolt 35. However, the optical axis adjuster bolt 35 may be omitted, and the first and second actuators 3, 4 held by the accommodation case 32 so as to be immovable along the linear actuation direction of the output shafts 15b.

In the above illustrated embodiment, the joint member 41, to which the first output shaft 21 is joined, is moved upward or downward (along the axis Y) relative to the lamp 2 when the joint insertion portion 43 is moved upward or downward in the joint hole 2f formed in the joint support 2e of the lamp 2. However, the joint member 41 and the lamp 2 may be moved relative to each other by means of any other suitable configuration. For example, a joint hole 2f may be formed in the joint member 41, and a joint insertion portion 43 may be formed in the joint support 2e. Alternatively, the joint member 41 may be immovable upward or downward relative to the lamp 2.

In the above described embodiment, the second supporting portion 2c is joined to the movable joint member 51 by inserting the distal portion of the second supporting portion 2c into the joint hole 51c. However, as long as the second supporting portion 2c is pivotable in various directions relative to the movable joint member 51, the second supporting portion 2c may be joined to the movable joint member 51 by means of any structure other than the joint hole 51c. For example, an upward projection support claws 51b and a support recess 51d between the support claws 51b may be formed on the slide main body 51a, the second supporting portion 2c may be joined to the movable joint member 51 by means of the pair of support claws 51b and the support recess 51d.

In the above illustrated embodiment, the second supporting portion 2c has a columnar rod-like shape. However, as long as it can be inserted into the joint hole 51c, the shape of the second supporting portion 2c is not limited to this. The second supporting portion 2c may have a polygonal columnar rod-like shape or any shape other than the rod-like shape.

In the illustrated embodiment, the movable joint member 51 allows the second supporting portion 2c to move upward or downward relative to the movable joint member 51 at the second actuation, by inserting the second supporting portion 2c into the joint hole 51c to join the second supporting portion 2c to the movable joint member 51. However, the movable joint member 51 may be configured so as not to permit the second supporting portion 2c to move upward or downward relative to the movable joint member 51 at the second actuation. In this case, the movable joint member 51 may be allowed to move upward or downward, so as to follow upward or downward movement of the second supporting portion 2c at the second actuation.

In the above described embodiment, the guide 1m accommodates the movable joint member 51 in the guide hole 1n, which extends along the central axis L2 of the second output shaft 22, so as to guide the movable joint member 51 along the central axis L2 of the second output shaft 22, while restricting movement of the movable joint member 51 along the second axis X. However, the guide 1m may hold the movable joint member 51 in any other manner. For example, a protrusion may be formed on the support plate 1c to extend along the central axis L2 of the second output shaft 22, and the protrusion may be used a guide portion. In this case, a recess engageable with the protrusion is formed on the movable joint member 51. Alternatively, a groove extending along the central axis L2 of the second output shaft 22 may be formed on the support plate 1c, and the movable joint member 51 may be arranged in the groove. These alternative structures achieve the same advantage as the above item (2) of the above embodiment.

In the above described embodiment, the lamp 2 is suspended from the post 1b by pivotably supporting the first supporting portion 2a at the supporting member 5. However, the first supporting portion 2a may be provided below the lamp 2 and the first supporting portion 2a may be joined to the supporting member 5 fixed to the support plate 1c, and a second supporting portion 2c may be provided above the lamp 2, so as to join the second supporting portion 2c to the movable joint member 51, which is held at the second supporting portion 2c to be slidable forward and rearward. In this case, the second actuator 4 is arranged rearward of the movable joint member 51 above the lamp 2, and the first actuator 3 is arranged rearward of the joint support 2e beside the first supporting portion 2a. These alternative structures achieve the same advantage as the above item (1) of the above embodiment.

The second ball joint portion 22a may be joined to the movable joint member 51 at a position displaced relative to the second ball portion 2d in the second axis X. The second ball joint portion 22a may be joined to the movable joint member 51 at a position displaced relative to the second ball portion 2d in the first axis Y.

In the above described embodiment, the first output shaft 21 is joined to the joint member 41 by means of the pair of support claws 42b and the support recess 42e. However, the first output shaft 21 may be joined to the joint member 41 by means of other structure. In the above described embodiment, the second output shaft 22 is joined to the movable joint member 51 by means of the pair of support claws 51b and the support recess 51d. However, the second output shaft 22 may be joined to the movable joint member 51 by means of other structure. For example, the output shaft 22 may be joined to the movable joint member 51 by a flexible member that absorbs force generated between the lamp 2 and the first and second output shafts 21, 22 at the first and second actuations.

The configuration of the first and second actuators 3, 4 is not limited to that described in the above embodiment as long as the output shafts 15b are actuated linearly by rotational actuating force of the motors 12.

A second embodiment of the present invention will now be described with reference to the drawings.

Figure 12:
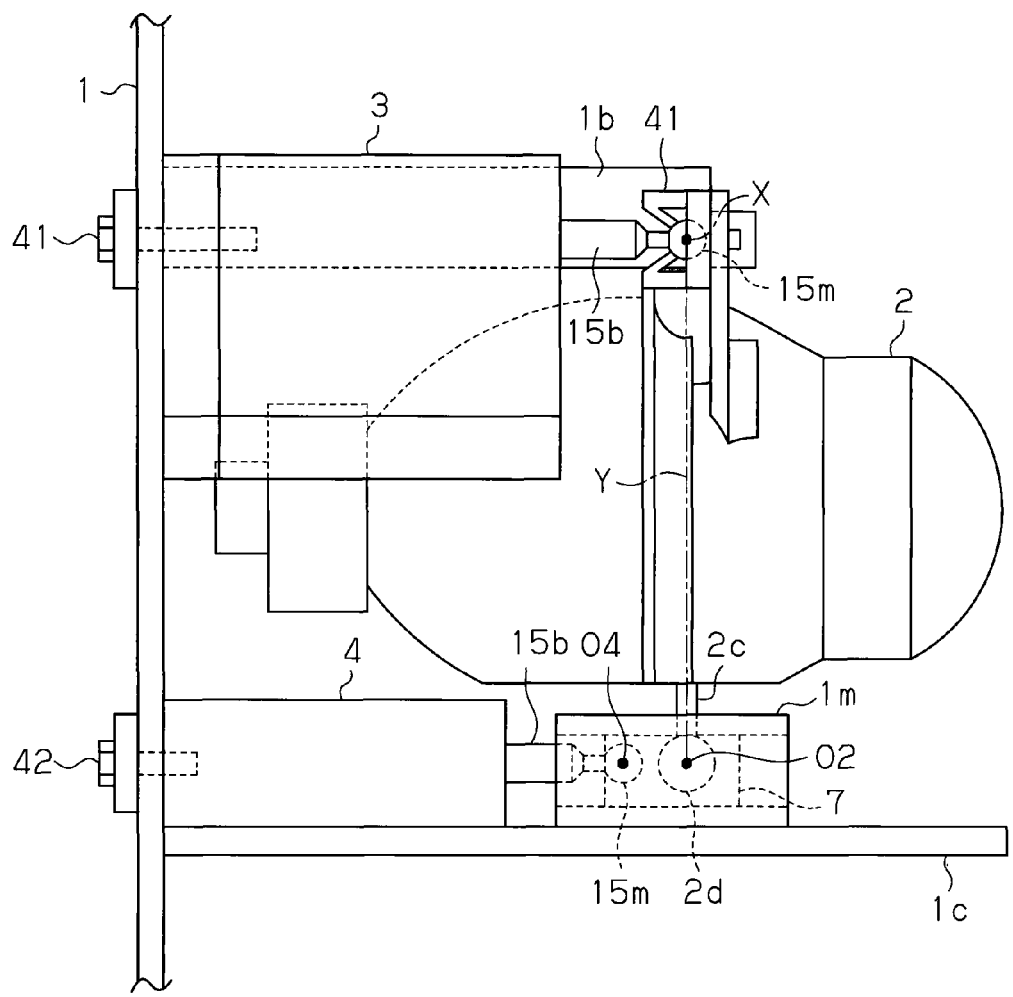
FIG. 12 is a side view illustrating a lamp device according to a second embodiment of the present invention.
Figure 13:
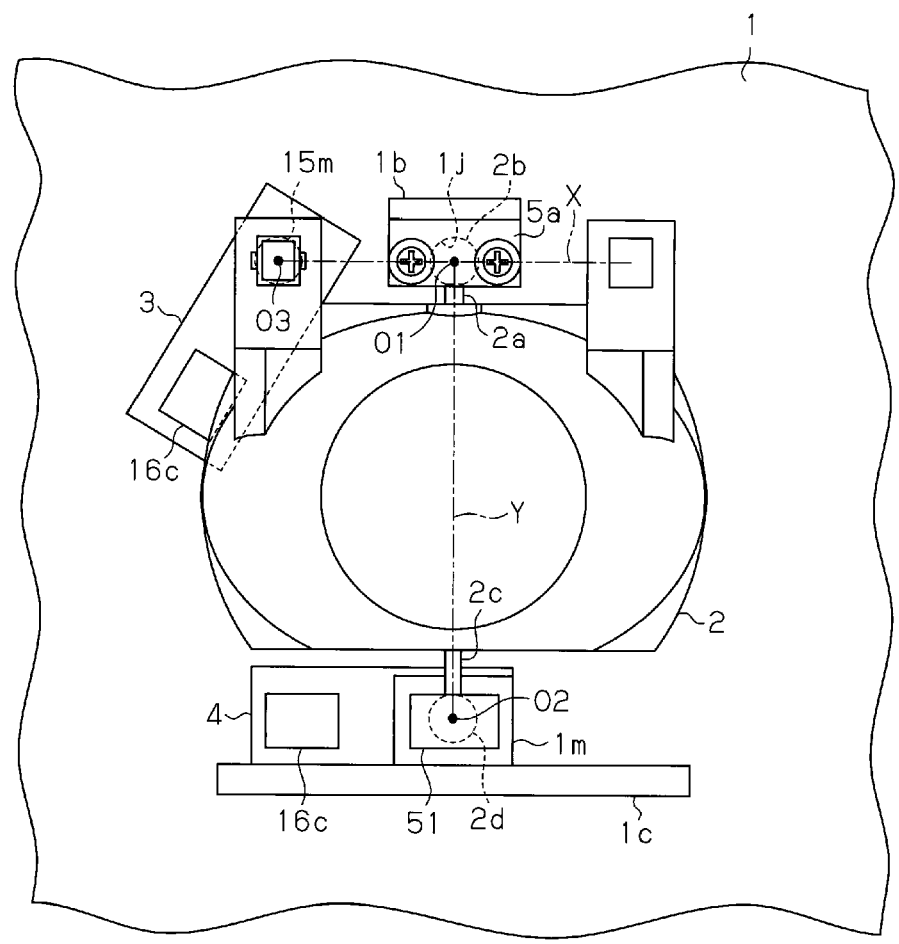
FIG. 13 is a front view of the lamp device shown in FIG. 12.

FIG. 12 is a diagram of a lamp device according to the present embodiment as viewed from a side (the right side with respect to the forward direction of the vehicle). FIG. 13 is a diagram showing the lamp device as viewed from the front (from the front of the vehicle). In the following description, the same reference numerals are given to those components that are the same as the corresponding components of the first embodiment, and all or part of the explanations are omitted.

A lamp body 1 according to the present embodiment includes a supporting member 5. As shown in FIG. 13, the supporting member 5 has a substantially spherical ball support recess 1j opened downward (facing the ground). A second actuator 4 is fixed to the support plate 1c.

The first ball portion 2b, which is arranged at the distal end of the first supporting portion 2a is inserted into the ball support recess 1j from the front of the vehicle (from the front of the sheet of FIG. 13), and the opening of the ball support recess 1j at the distal end of the post 1b is closed by a plate 5a threaded to the post 1b. The lamp 2 is thus supported to be pivotable relative to the lamp body 1 with the center O1 of the first ball portion 2b acting as a fulcrum (pivot center).

Figure 14:
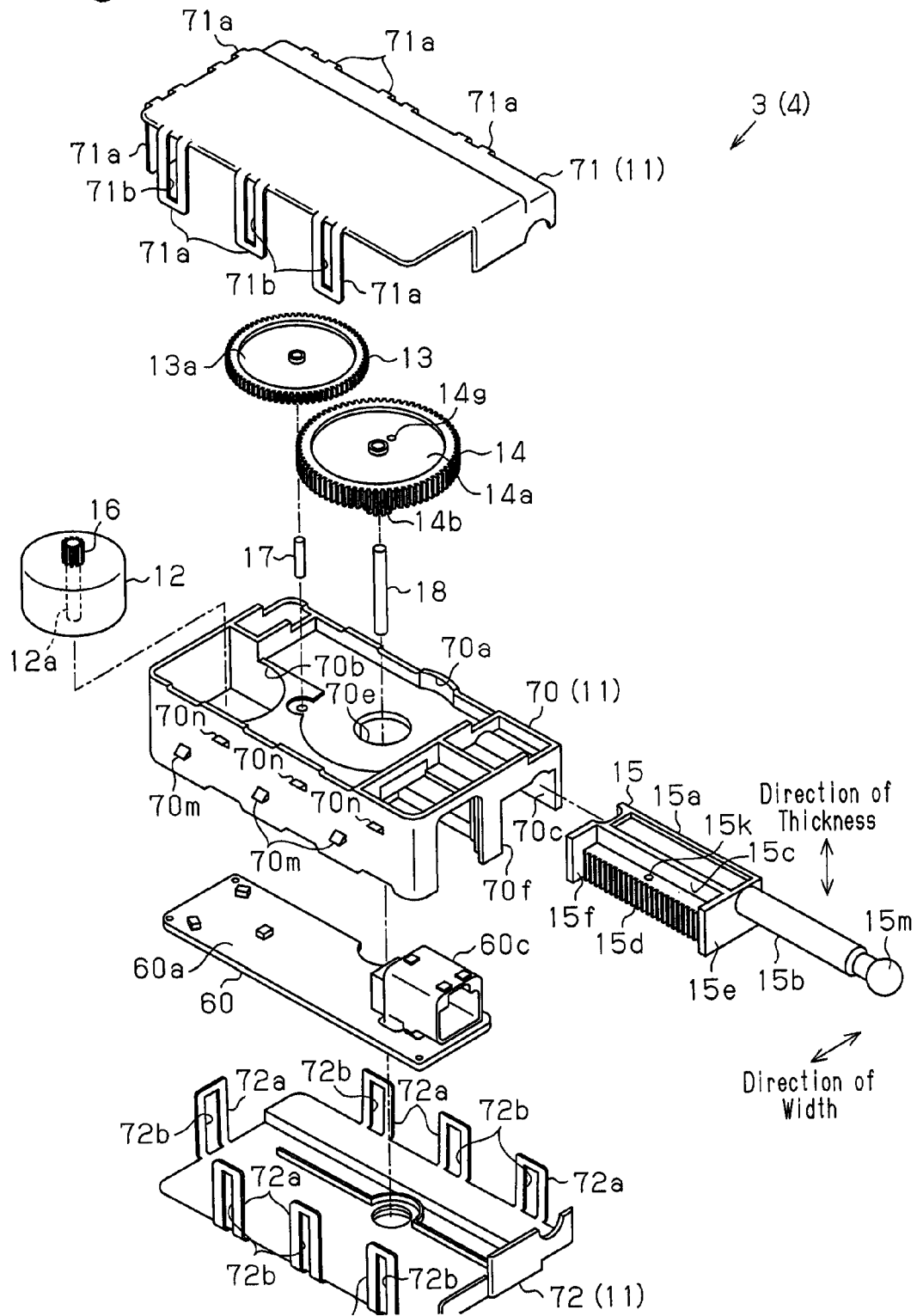
FIG. 14 is an exploded perspective view showing the actuator used in the lamp device shown in FIG. 12.

As shown in FIG. 14, the first actuator 3 has a housing 11, which incorporates a motor 12, a reduction gear member 13, an output gear member 14, a rack member 15, and a control circuit device 60.

Figure 16:
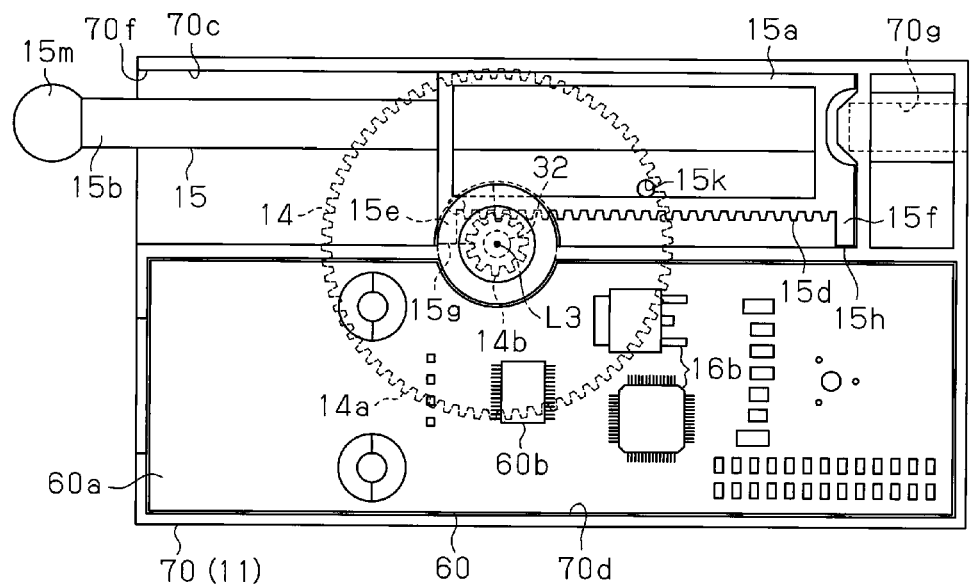
FIG. 16 is a bottom view of the actuator shown in FIG. 14.

The housing 11 includes a housing main body 70, which is substantially a rectangular parallelepiped, and first and second covers 71, 72. The first and second covers 71, 72 are substantially rectangular plates attached to the sides of the housing main body 70 with respect to the direction of thickness. A gear accommodating recess 70a is formed in a first end of the housing main body 70 along the direction of the thickness (the upper end as viewed in FIG. 14). A motor accommodating recess 70b is formed in a corner of the bottom of the gear accommodating recess 70a (left corner as viewed in FIG. 14). As shown in FIG. 16, a rack accommodating recess 70c and a substrate accommodating recess 70d are formed in a second end of the housing main body 70 along the direction of the thickness (the lower end as viewed in FIG. 14). The rack accommodating recess 70c and the substrate accommodating recess 70d are arranged to be parallel to each other along the longitudinal direction of the housing main body 70 and each have a substantially rectangular shape. As shown in FIG. 14, a circular through hole 70e is formed in the bottom of the rack accommodating recess 70c. The through hole 70e connects the rack accommodating recess 70c with the gear accommodating recess 70a. An opening 70f is formed at one end of the rack accommodating recess 70c in the longitudinal direction (end closer to the front of the vehicle). The opening 70f opens to the outside. Further, as shown in FIG. 16, a threaded hole 70g is formed at an end of the housing main body 70 that is opposite to the opening 70f of the rack accommodating recess 70c.

As shown in FIG. 14, the first cover 71 has on the periphery eight first engaging claws 71a extending toward the housing main body 70. Each first engaging claw 71a has a first engaging hole 71b. First engaging projections 70m are formed on the outer surface of the housing main body 70. The first cover 71 is arranged on the housing main body 70 to close the opening of the gear accommodating recess 70a, so that the each first engaging projection 70m is engaged with the first engaging hole 71b of one of the first engaging claws 71a by snap fit. In this manner, the first cover 71 is fixed to the housing main body 70. The second cover 72 has on the periphery seven second engaging claws 72a extending toward the housing main body 70. Each second engaging claw 72a has a second engaging hole 72b. Second engaging projections 70n are formed on the outer surface of the housing main body 70. The second cover 72 is arranged on the housing main body 70 to close the openings of the rack accommodating recess 70c and the substrate accommodating recess 70d, so that the each second engaging projection 70n is engaged with the second engaging hole 72b of one of the second engaging claws 72a by snap fit. In this manner, the second cover 72 is fixed to the housing main body 70.

The motor accommodating recess 70b accommodates the substantially columnar motor 12. The distal end of the rotary shaft of the motor 12 projects from the side opposite to the bottom of the motor accommodating recess 70b, that is, from the side corresponding to the gear accommodating recess 70a.

Figure 15:
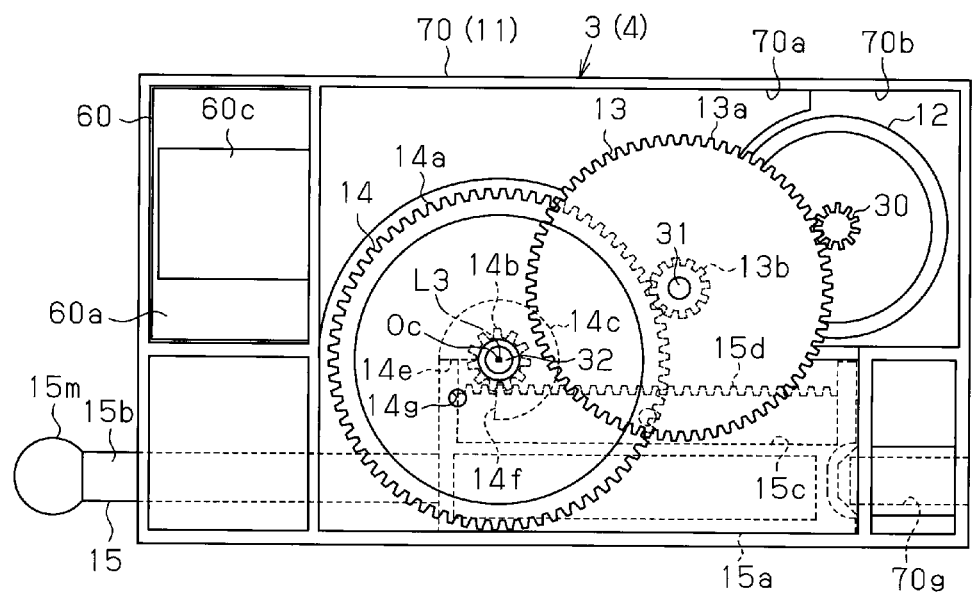
FIG. 15 is a diagram explaining the configuration of the actuator shown in FIG. 14.

As shown in FIGS. 14 and 15, the reduction gear member 13 is provided beside the motor 12 (diagonally downward left of the motor 12 as viewed in FIG. 15) in the gear accommodating recess 70a. The reduction gear member 13 is formed by integrating a disk-like large diameter reduction gear 13a and a disk-like small diameter reduction gear 13b having a smaller diameter than the large diameter reduction gear 13a. The large diameter reduction gear 13a is meshed with the drive gear 16. The large diameter reduction gear 13a and the small diameter reduction gear 13b are arranged to be displaced in the axial direction, while the rotational axes thereof (the centers in the radial direction) are coincide with each other. The reduction gear member 13 is accommodated in the gear accommodating recess 70a such that the small diameter reduction gear 13b is arranged closer to the bottom of the gear accommodating recess 70a, and that the large diameter reduction gear 13a is arranged closer to the opening of the gear accommodating recess 70a. The columnar first support shaft 17 extends axially through the radial center of the reduction gear member 13. The first support shaft 17 is supported by the housing main body 20 at the bottom of the gear accommodating recess 20a. The reduction gear member 13 is rotatable about the first support shaft 17.

In the gear accommodating recess 70a, the gear member 14 is arranged beside the reduction gear member 13 (diagonally downward left of the reduction gear member 13 as viewed in FIG. 15). The gear member 14 is formed by integrating a disk-like large diameter gear 14a, a disk-like small diameter gear 14b having a smaller diameter than the large diameter gear 14a, and a actuating-side stopper 14c. The large diameter gear 14a is meshed with the small diameter reduction gear 13b. The large diameter gear 14a and the small diameter gear 14b are arranged to be displaced in the axial direction, while the rotational axes thereof (the centers in the radial direction) are coincide with each other. The actuating-side stopper 14c is formed between the large diameter gear 14a and the small diameter gear 14b in the axial direction.

Figure 17:
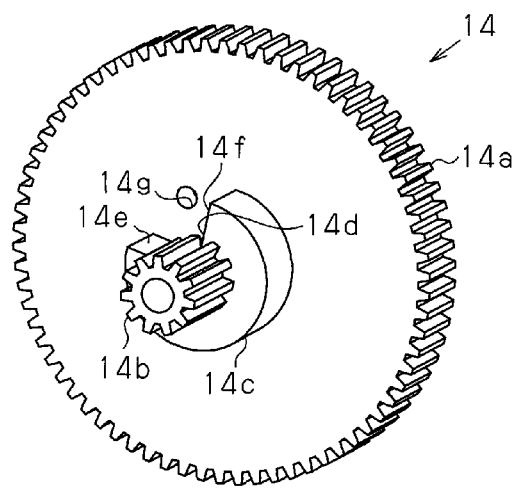
FIG. 17 is a perspective view illustrating a gear member used in the actuator shown in FIG. 14.
Figure 18:
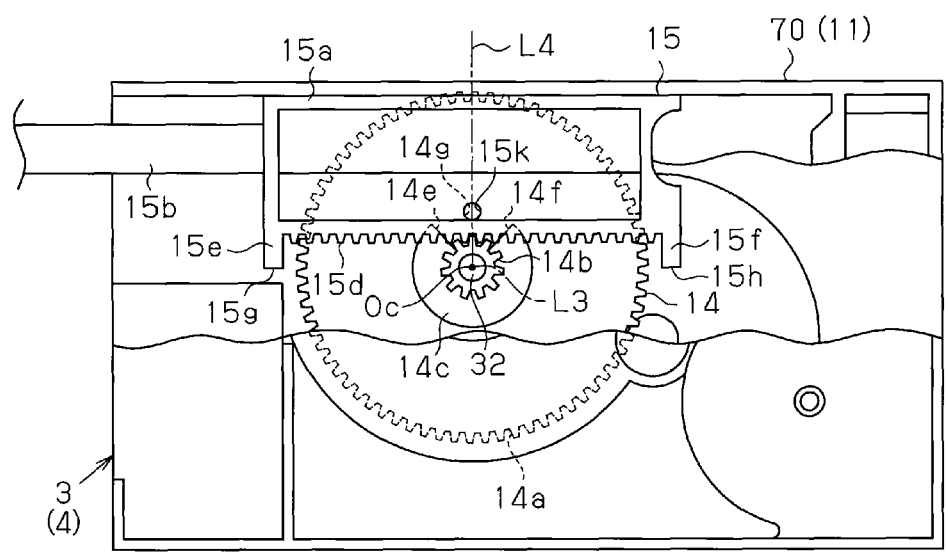
FIG. 18 is a diagram of the actuator shown in FIG. 14.

As shown in FIG. 17, the actuating-side stopper 14c is shaped like a column and has a cutout recess 14d extending inward in the radial direction. The outer diameter of the actuating-side stopper 14c is greater than that of the small diameter gear 14b, and is smaller than that of the large diameter gear 14a. As shown in FIG. 18, the center of curvature Oc of the outer circumferential surface of the actuating-side stopper 14c is on the rotational axis L3 of the gear member 14. That is, the large diameter gear 14a, the small diameter gear 14b, and the actuating-side stopper 14c are arranged such that the central axes thereof are on the same line.

The cutout recess 14d has a sectoral shape when viewed along the direction of the rotational axis L3 of the gear member 14, and is formed to range from one end to the other end in the axial direction. The cutout recess 14d opens outward in the radial direction. First and second actuating-side contact surfaces 14e and 14f are formed at the ends of the cutout recess 14d in the circumferential direction, that is, at the ends of the actuating-side stopper 14c in the circumferential direction. The first and second actuating-side contact surfaces 14e and 14f each extend in the radial direction of the actuating-side stopper 14c, and forms a flat surface that is perpendicular to the circumferential direction of the actuating-side stopper 14c (that is, the rotational direction of the gear member 14).

The large diameter gear 14a has a first positioning hole 14g, which is used for determining the position relative to the rack member 15. When viewed along the direction of the rotational axis L3 of the gear member 14, the first positioning hole 14g is formed along a straight line L4, which passes through the center in the circumferential direction of the cutout recess 14d and extends in the radial direction. The first positioning hole 14g also extends through the large diameter gear 14a along the axial direction. The first positioning hole 14g has a circular shape when viewed along the direction of the rotational axis L3 of the gear member 14.

As shown in FIGS. 14 and 15, the gear member 14 is arranged in relation to the housing main body 70 such that the large diameter gear 14a is adjacent to the bottom of the gear accommodating recess 70a in the gear accommodating recess 70a, and that the small diameter gear 14b and the actuating-side stopper 14c project into the rack accommodating recess 70c through the through hole 70e. The columnar second support shaft 18 extends axially through the radial center of the gear member 14. The second support shaft 18 is fixed to the first cover 71, so that the gear member 14 is rotatable about the second support shaft 18. The gear member 14 is arranged in the housing main body 70, such that, depending on the rotational position, the first positioning hole 14g is exposed to the interior of the rack accommodating recess 70c through the through hole 70e.

As shown in FIG. 16, the rack member 15 is arranged in the rack accommodating recess 70c. The rack member 15 is formed by integrating a substantially rectangular parallelepiped rack 15a and an output shaft 15b, which extends from one end of the rack 15a in the longitudinal direction along the longitudinal direction of the rack 15a and serves as an output portion.

As shown in FIG. 14, a stopper recess 15c is formed in the rack 15a at a position facing the bottom of the rack accommodating recess 70c. The stopper recess 15c opens at one side in the direction of thickness and one side in the direction of width of the rack 15a (a side facing the small diameter gear 14b as viewed in FIG. 15). The stopper recess 15c extends along the longitudinal direction of the rack 15a (or the direction along which the rack member 15 as the gear member 14 rotates), from one end to the other of the rack 15a. The depth of the stopper recess 15c is slightly less than the length in the axial direction of the actuating-side stopper 14c of the gear member 14. The bottom of the stopper recess 15c is a flat surface.

The rack 15a has a rack gear portion 15d at a position adjacent to the stopper recess 15c along the direction of thickness of the rack 15a (the same direction as the direction of the rotational axis L3 of the gear member 14 in the housing main body 70). The rack gear portion 15d is meshed with the small diameter gear 14b of the gear member 14. The rack gear portion 15d has a plurality of teeth that are arranged along the longitudinal direction of the rack 15a from one end to the other in the longitudinal direction of the rack 15a.

A first actuated-side stopper 15e and a second actuated-side stopper 15f are integrally formed with the rack 15a at both ends in the longitudinal direction, or at both ends in the longitudinal direction of the stopper recess 15c and the rack gear portion 15d. The first actuated-side stopper 15e and the second actuated-side stopper 15f are rectangular plates and project further than the rack gear portion 15d along the direction of width of the rack 15a, that is, in a direction in which the small diameter gear 14b meshed with the rack gear portion 15d faces the rack gear portion 15d. As shown in FIG. 16, the distal end faces of the first actuated-side stopper 15e and the second actuated-side stopper 15f (the end faces in the direction of the width of the rack 15a) are flat first and second actuated-side contact surfaces 15g and 15h, which are parallel to the longitudinal direction of the rack 15a and perpendicular to the direction of the width of the rack 15a.

Further, the rack 15a has a second positioning hole 15k in the bottom of the stopper recess 15c. The second positioning hole 15k extends through the thickness of the rack 15a. The second positioning hole 15k is located at a position corresponding to the center in the longitudinal direction of the rack gear portion 15d, and has a circular shape when viewed in the direction of thickness of the rack 15a. The diameter of the second positioning hole 15k is equal to that of the first positioning hole 14g formed in the large diameter gear 14a of the gear member 14. Depending on the position of the rack member 15 in the rack accommodating recess 70c, the second positioning hole 15k is exposed to the gear accommodating recess 70a through the through hole 70e.

Figure 19A:
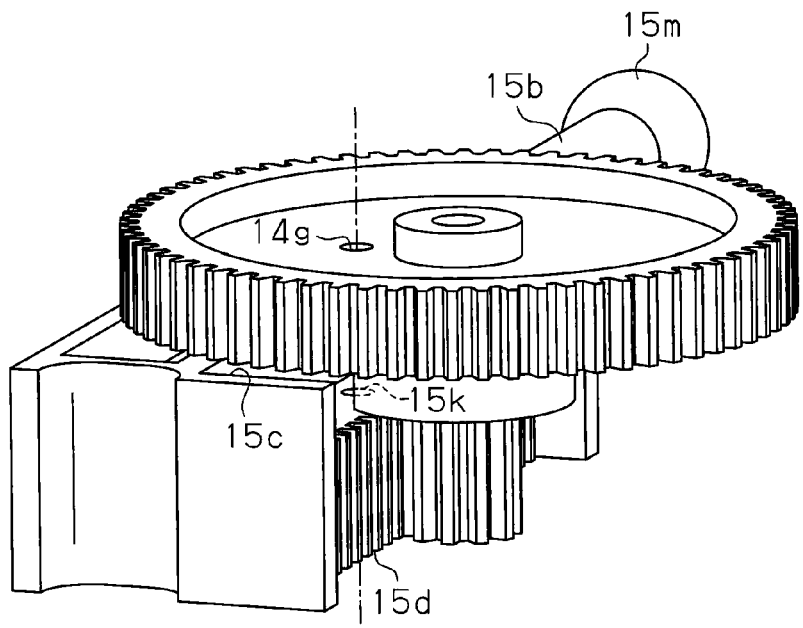
FIG. 19A is a perspective view illustrating the gear member and the rack member meshed with each other in the actuator shown in FIG. 14.
Figure 19B:
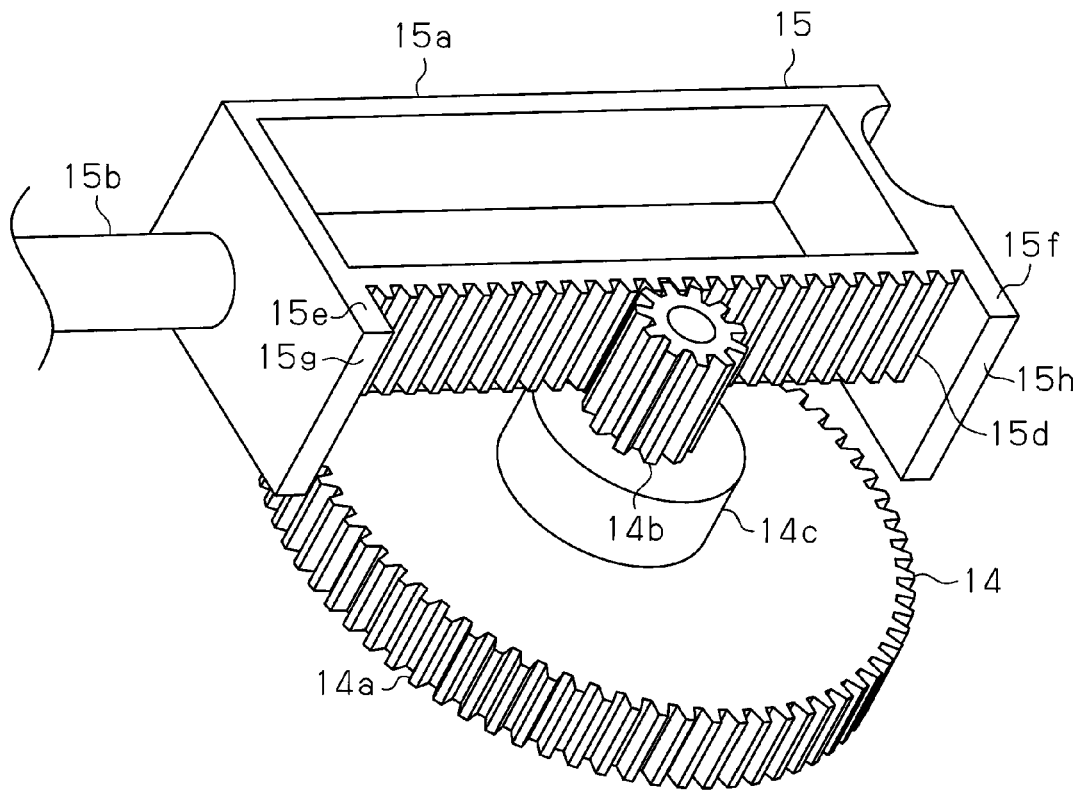
FIG. 19B is a perspective view illustrating the gear member and the rack member meshed with each other in the actuator shown in FIG. 14.

As shown in FIGS. 18 and 19A, the rack member 15 and the gear member 14 are assembled together by meshing the rack gear portion 15d and the small diameter gear 14b with each other in a state, when viewed along the rotational axis L3 of the gear member 14, with the first positioning hole 14g and the second positioning hole 15k, which are exposed through the through hole 70e, are aligned with each other, that is, the first positioning hole 14g and the second positioning hole 15k overlap in the axial direction. Accordingly, the gear member 14 and the rack member 15 can be easily installed in the proper installation positions while being meshed with each other. In the present embodiment, the proper installation positions of the gear member 14 and the rack member 15 are positions at which the rack member 15, which is moved linearly as the gear member 14 rotates, is at the center in the moving range. When the gear member 14 and the rack member 15 are assembled to each other, the actuating-side stopper 14c is substantially accommodated in the stopper recess 15c, and an end face in the axial direction of the actuating-side stopper 14c that is closer to the small diameter gear 14b of the actuating-side stopper 14c slidably contacts the bottom of the stopper recess 15c (see FIG. 19B).

As shown in FIGS. 14 and 16, the output shaft 15b has a columnar shape that extends from an end of the rack 15a at the opening 70f of the rack accommodating recess 70c and parallel to the moving direction of the rack 15a when the gear member 14 rotates, and protrudes to the outside of the housing m11 through the opening 70f of the rack accommodating recess 70c. The output shaft 15b has at its distal end a ball joint portion 15m.

The substrate accommodating recess 70d accommodates the control circuit device 60. The control circuit device 60 includes a substantially rectangular plate-shaped circuit substrate 60a and a plurality of electronic components 60b mounted on the substrate 60a. A substantially rectangular tube-shaped connector portion 60c is fixed to a surface of the circuit substrate 60a that faces the bottom of the substrate accommodating recess 70d. An external connector (not shown) for supplying electricity to the first actuator 3 is connected to the connector portion 60c.

According to the above described first actuator 3, when electricity is supplied from the connector portion 60c as shown in FIG. 15 so that the motor 12 is driven in the control circuit device 60, rotation of the rotary shaft 12a rotates the drive gear 16. The rotational actuating force of the motor 12 is then transmitted to the gear member 14 from the drive gear 16 through the reduction gear member 13 while being decelerated. Rotational motion of the gear member 14 is converted into linear motion of the rack member 15 by means of the rack gear portion 15d meshed with the small diameter gear 14b. As the gear member 14 rotates, the rack member 15 is moved linearly, so that the output shaft 15b is actuated linearly along the axial direction thereof. At this time, the actuating-side stopper 14c is rotated as the gear member 14 is rotated beside the rack gear portion 15d, and the end face of the actuating-side stopper 14c in the axial direction closer to the small diameter gear 14b slides on the bottom of the stopper recess 15c.

Figure 20A:
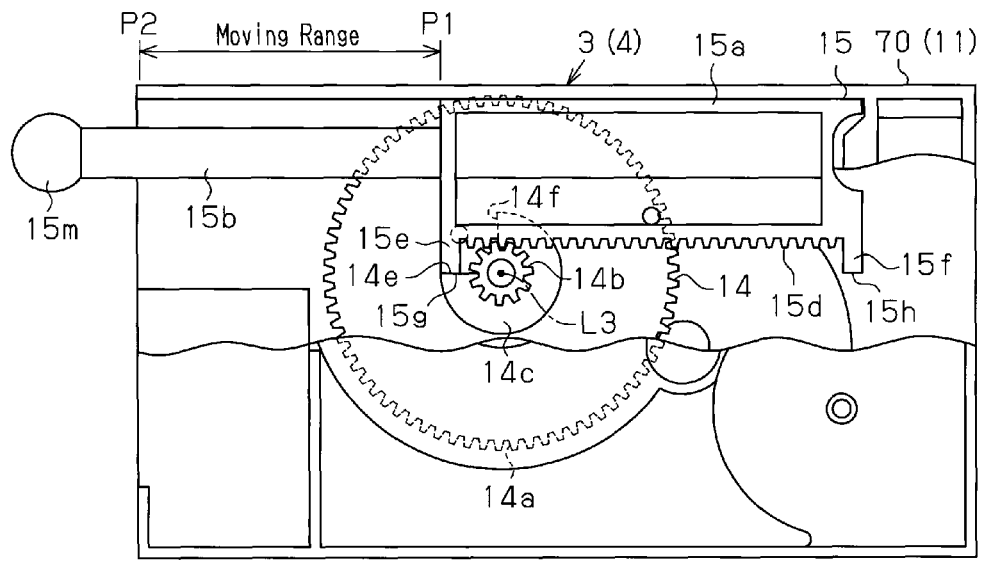
FIG. 20A is a diagram showing the actuator in a state where the rack member is located at the initial position.
Figure 20B:
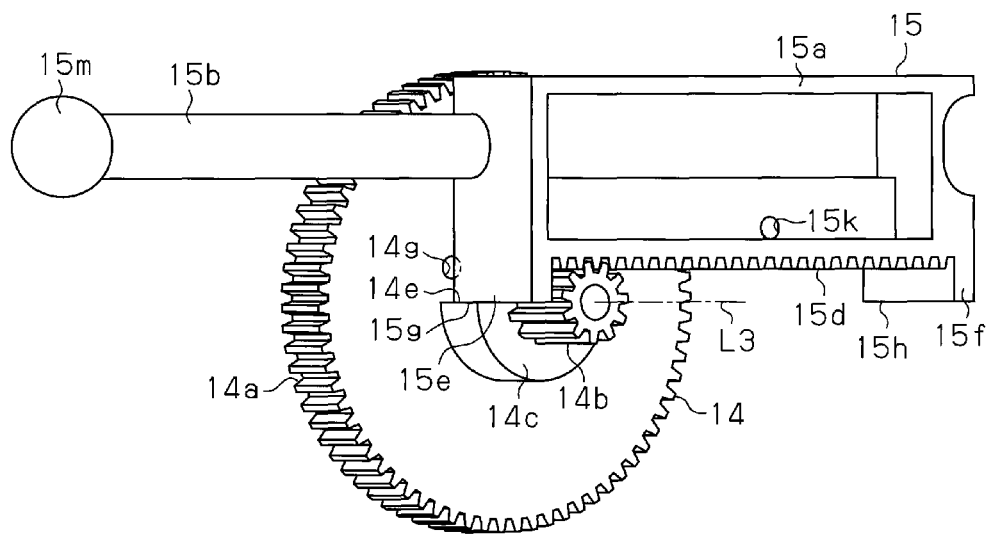
FIG. 20B is a perspective view illustrating the rack member at the initial position and the gear member.

For example, when the gear member 14 is rotated counterclockwise by 313° as shown in FIG. 20A from a state where the rack member 15 is at the center in the moving range thereof as shown in FIG. 18, the first actuating-side contact surface 14e of the actuating-side stopper 14c contacts the first actuated-side contact surface 15g of the first actuated-side stopper 15e of the rack member 15 along the rotational direction of the gear member 14, so that further clockwise rotation of the gear member 14 is prevented. That is, at an initial position P1 of the moving range of the rack member 15, the first actuating-side contact surface 14e of the actuating-side stopper 14c contacts the first actuated-side contact surface 15g of the first actuated-side stopper 15e, so that the rack member 15 is prevented from moving beyond a predetermined moving range. At this time, as shown in FIG. 20B, the first actuating-side contact surface 14e of the actuating-side stopper 14c and the first actuated-side contact surface 15g of the first actuated-side stopper 15e contact each other at an end of the rack 15a in the longitudinal direction (the same as the movable direction of the rack member 15), specifically at a position spaced from the rack gear portion 15d along the direction of the rotational axis L3 of the gear member 14. In FIGS. 20A and 20B, the moving range of the rack member 15 is illustrated with reference to an end in the longitudinal direction of the rack 15a close the output shaft 15b.

Figure 21A:
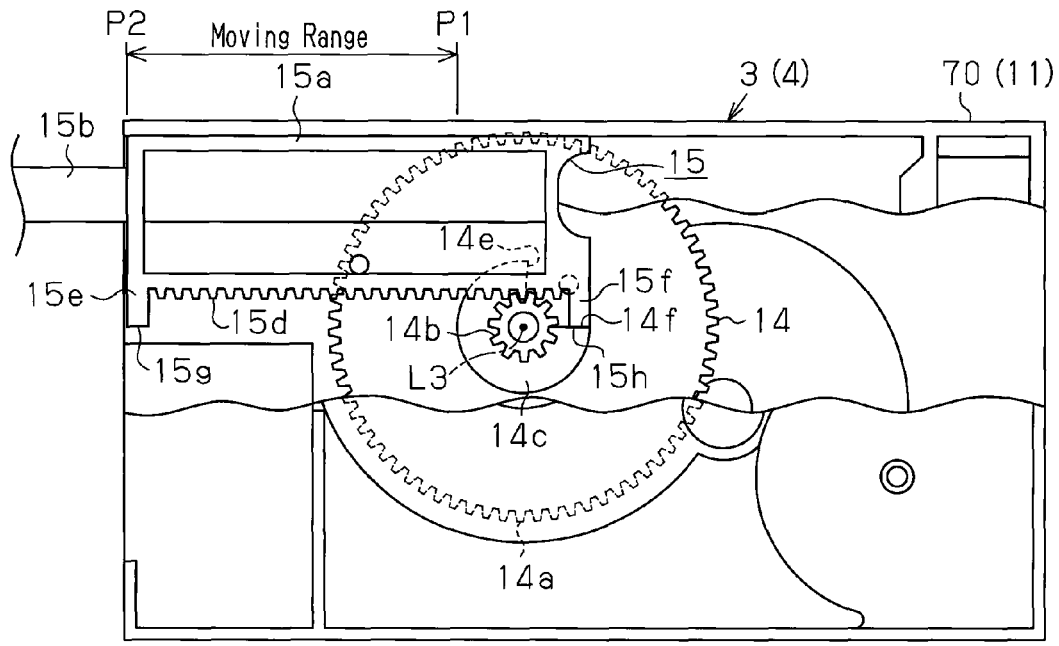
FIG. 21A is a diagram showing the actuator in a state where the rack member is located at the end position.
Figure 21B:
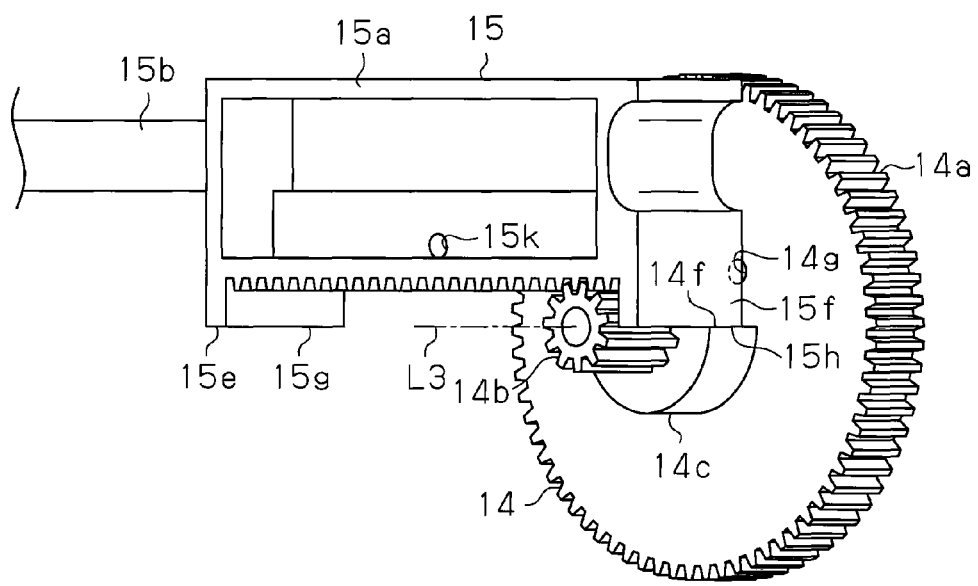
FIG. 21B is a perspective view illustrating the rack member at the end position and the gear member.

For example, when the gear member 14 is rotated counterclockwise by 313° as shown in FIG. 21A from a state where the rack member 15 is at the center in the moving range thereof as shown in FIG. 18, the second actuating-side contact surface 14f of the actuating-side stopper 14c contacts the second actuated-side contact surface 15h of the second actuated-side stopper 15f of the rack member 15 along the rotational direction of the gear member 14, so that further counterclockwise rotation of the gear member 14 is prevented. That is, at an end position P2 of the moving range of the rack member 15, the second actuating-side contact surface 14f of the actuating-side stopper 14c contacts the second actuated-side contact surface 15h of the second actuated-side stopper 15f, so that the rack member 15 is prevented from moving beyond the predetermined moving range. At this time, as shown in FIG. 21B, the second actuating-side contact surface 14f of the actuating-side stopper 14c and the second actuated-side contact surface 15h of the second actuated-side stopper 15f contact each other at an end of the rack 15a in the longitudinal direction (the same as the movable direction of the rack member 15), specifically at a position spaced from the rack gear portion 15d along the direction of the rotational axis L3 of the gear member 14.

Since the second actuator 4 has the same structure as the first actuator 3, the same reference numerals are given to those components that are the same as the corresponding components of the first actuator 3 and detailed explanations are omitted. The housing 11 of the first actuator 3 corresponds to a first housing, and the output shaft 15b of the first actuator 3 corresponds to a first output portion. Further, the housing 11 of the second actuator 4 corresponds to a second housing, and the output shaft 15b of the second actuator 4 corresponds to a second output portion.

The present embodiment provides the following advantages.

(11) The rack member 15 having the rack gear portion 15d, which is meshed with the small diameter gear 14b of the gear member 14, is moved linearly as the gear member 14 rotates. When the gear member 14 is rotated by a predetermined angle that corresponds to the moving range of the rack member 15, the actuating-side stopper 14c of the gear member 14 contacts the first actuated-side stopper 15e or the second actuated-side stopper 15f of the rack member along the rotational direction of the gear member 14, so that the further rotation of the gear member 14 and further linear motion of the rack member 15 are prevented. That is, when the rack member 15 is at the initial position P1, which is one end of the moving range of the rack member 15, the actuating-side stopper 14c contacts the actuated-side stopper 15e. When the rack member 15 is at the end position P2, which is the other end of the moving range of the rack member 15, the actuating-side stopper 14c contacts the second actuated-side stopper 15f. The actuating-side stopper 14c is provided in the gear member 14, which has the small diameter gear 14b, and the first and second actuated-side stoppers 15e, 15f are provided in the rack member 15, which has the rack gear portion 15d meshed with the small diameter gear 14b. Thus, the force applied by the gear member 14 to move the rack member 15 linearly is received by the first actuating-side stopper 15e or the second actuated-side stopper 15f, which contacts the actuating-side stopper 14c. Therefore, when the rack member 15 is at the initial position P1 or the end position P2 in the moving range, meshing parts of the small diameter gear 14b and the rack gear portion 15d are prevented from receiving high load. As a result, the width of the small diameter gear 14b or the rack gear portion 15d does not need to be increased to ensure the strength of the small diameter gear 14b and the rack gear portion 15d. The sizes of the first and second actuators 3, 4 are therefore prevented from being increased.

(12) When the rack member 15 moves, the end face in the axial direction of the actuating-side stopper 14c at the small diameter gear 14b slides on the side surface extending along the moving direction of the rack member 15 on the rack member 15, that is, on the bottom of the stopper recess 15c, which is formed in the rack member 15. Therefore, the rack member 15 is prevented from chattering and is allowed to move linearly in a stable manner.

(13) The actuating-side stopper 14c contacts the first and second actuated-side stoppers 15e, 15f along the rotational direction of the gear member 14. Therefore, by forming the first and second actuated-side stoppers 15e, 15f at both ends of the rack 15a along the moving direction of the rack member 15, it is possible to simplify the shape of the actuating-side stopper 14c, which is provided on the gear member 14 rotating relative to the rack member 15.

(14) Since the actuating-side stopper 14c is arranged in the stopper recess 15c, the space in the housing 11 in which the gear member 14 and the rack member 15 are arranged can be reduced along the rotational direction L3 of the gear member 14. This allows the sizes of the first and second actuators 3, 4 to be reduced along the rotational axis L3 of the gear member 14.

(15) The gear member 14 and the rack member 15 are assembled with the first positioning hole 14g and the second positioning hole 15k being aligned with each other when viewed along the rotational axis L3 of the gear member 14. This allows the gear member 14 and the rack member 15 to be easily assembled at the proper installation position. This improves the productivity of the first and second actuators 3, 4.

(16) In the gear member 14, the actuating-side stopper 14c is located between the large diameter gear 14a and the small diameter gear 14b. The actuating-side stopper 14c is displaced along the rotational axis L3 of the gear member 14 from the small diameter gear 14b meshed with the rack gear portion 15d. When the motor 12 is driven, the actuating-side stopper 14c is rotated along the circumferential direction of the gear member 14 as the gear member 14 rotates at a position beside the rack gear portion 15d (that is, beside the gear member 14 in the rack gear portion 15d along the direction of the rotational axis L3 of the gear member 14). When the rack member 15 is arranged at the initial position P1, the first actuating-side contact surface 14e of the actuating-side stopper 14c and the first actuated-side contact surface 15g of the first actuated-side stopper 15e contact each other at an end of the rack 15a in the longitudinal direction (the same as the movable direction of the rack member 15), specifically, at a position spaced from the rack gear portion 15d along the direction of the rotational axis L3 of the gear member 14. Likewise, when the rack member 15 is arranged at the end position P2, the second actuating-side contact surface 14f of the actuating-side stopper 14c and the second actuated-side contact surface 15h of the second actuated-side stopper 15f contact each other at an end of the rack 15a in the longitudinal direction (the same as the movable direction of the rack member 15), specifically, at a position spaced from the rack gear portion 15d along the direction of the rotational axis L3 of the gear member 14. Therefore, rotation of the gear member 14 over 360° is not prevented by the actuating-side stopper 14c, the first actuated-side stopper 15e, and the second actuated-side stopper 15f. Thus, the rotational angle of the gear member 14 is freely determined in accordance with the moving range of the rack member 15.

(17) The lamp 2 or the lamp body 1 does not need to have a stopper that contacts the rack member 15 to set the initial position P1 and the end position P2 of the moving range of the rack member 15. Since the actuating-side stopper 14c contacts the first and second actuated-side stoppers 15e, 15f within the first and second actuators 3, 4, abrasion particles produced at such contact is trapped in the housing 11. This keeps the interior of the head lamp arranged in the lamp device clean.

The embodiments of the present invention may be modified as follows.

In the first and second embodiments, the first and second actuators 3, 4 are incorporated in the lamp device to adjust the direction of light emitted by the lamp 2. However, other than lamp devices, the first and second actuators 3, 4 may be used in any device that utilizes linear motion of the output shaft 15b.

The positions of the first positioning hole 14g and the second positioning hole 15k are not limited to those of the second embodiment as long as, when the gear member 14 and the rack member 15 are assembled to each other at proper installation positions, the positioning hole 14g and the second positioning hole 15k overlap with each other along the axial direction when viewed along the direction of the rotational axis L3 of the gear member 14. Also, the gear member 14 and the rack member 15 may be configured without the first positioning hole 14g and the second positioning hole 15k.

In the second embodiment, the rack member 15 may be configured without the stopper recess 15c. In this case, if one axial end of the actuating-side stopper 14c facing the small diameter gear 14b is allowed to slide on a side the rack member 15 along the moving direction of the rack member 15, chattering of the rack member 15 is suppressed, and linear motion of the rack member 15 thus becomes stable.

In the second embodiment, the actuating-side stopper 14c is formed between the large diameter gear 14a and the small diameter gear 14b. However, the actuating-side stopper 14c may be arranged at such a position that the small diameter gear 14b is held between the actuating-side stopper 14c and the large diameter gear 14a. In this case, if the rack member 15 is held between the large diameter gear 14a and the actuating-side stopper 14c along a direction perpendicular to the moving direction of the rack member 15, chattering of the rack member 15 is further suppressed, and the movement of the rack member 15 becomes more stable.

In the second embodiment, the first and second actuated-side stoppers 15e, 15f are formed at both ends in the moving direction of the rack member 15 in the rack 15a having the rack gear portion 15d. However, the first and second actuated-side stoppers 15e, 15f may be formed at any positions on the rack member 15 as long as, when the rack member 15 is at the initial position P1 and the end position P2, the actuating-side stopper 14c of the gear member 14 can contact the stoppers 15e, 15f along the rotation direction of the gear member 14.

In the second embodiment, the end face of the actuating-side stopper 14c that corresponds to the small diameter gear 14b slides on the bottom of the stopper recess 15c formed in the rack 15a. However, the end face of the actuating-side stopper 14c corresponding to the small diameter gear 14b does not need to slide on the rack 15a.

In the second embodiment, the actuating-side stopper 14c is shaped like a column and has the cutout recess 14d extending inward in the radial direction. The outer diameter of the actuating-side stopper 14c is greater than that of the small diameter gear 14b, and is smaller than that of the large diameter gear 14a. However, the shape of the actuating-side stopper 14c is not limited to this, but may be changed as long as, when the rack member 15 is arranged at the initial position P1 and the end position P2, the actuating-side stopper 14c can contact the first and second actuated-side stoppers 15e, 15f along the direction of rotation of the gear member 14. For example, the actuating-side stopper 14c may be shaped as a column having a diameter smaller than that of the small diameter gear 14b. Also, the actuating-side stopper 14c may have a sectoral shape when viewed in the axial direction with a contact surface at each end in the circumferential direction (the same direction as the rotation direction of the gear member 14). In this case, each contact surface is perpendicular to the rotation direction of the gear member 14. The actuating-side stopper 14c may be shaped like a rod that has a polygonal cross section perpendicular to the rotational axis L3 of the gear member 14.

In the second embodiment, the rack member 15 is located at the initial position P1 when the gear member 14 is rotated by 313° clockwise from the position at the center in the moving range. Also, the rack member 15 is located at the end position P2 when the gear member 14 is rotated by 313° counterclockwise from the position at the center in the moving range. However, the rotational angle of the gear member 14 required for the rack member 15 to reach the initial position P1 and the end position P2 is not limited to the angle described in the embodiment, but may be changed as necessary in accordance with the moving range of the rack member 15.

In the in the first and second embodiments, only one reduction gear member 13 is provided between the drive gear 30 and the gear member 14. However, two or more reduction gear members 13 may be provided between the drive gear 30 and the gear member 14. Alternatively, the reduction gear member 13 may be omitted, so that the drive gear 30 and the large diameter gear 14a directly mesh with each other.

In the second embodiment, the first and second actuators 3, 4 are directly fixed to the lamp body 1 by means of the screws 41, 42. However, the first and second actuators 3, 4 may be each arranged in a supporting member that is shaped like a rectangular tube fixed to the lamp body 1, so that the actuators 3, 4 are held by the lamp body 1 by means of the supporting members. In this case, the first and second actuators 3, 4 may be each fixed to the bottom of the corresponding supporting member with screws, and the position of the actuators 3, 4 may be adjustable in the front-rear direction in accordance with the rotation amount of the screws.

In the first and second embodiments, the lamp device according to the present invention is used as a lamp device mounted on a vehicle. However, the lamp device of the present invention may be used as lamp devices used for other apparatuses than vehicles.

The invention claimed is:

1. A lamp device capable of performing a first actuation and a second actuation, wherein, at the first actuation, the lamp device pivots a lamp about a first axis relative to a support, and, at the second actuation, the lamp device pivots the lamp about a second axis, which is perpendicular to the first axis, relative to the support, the lamp device comprising:
   a first actuator held by the support, the first actuator being used for performing the first actuation, wherein the first actuator includes a first output portion and a first drive source for moving the first output portion linearly along a first actuation axis, the first actuation axis being skew to the first axis and intersecting the second axis; and
   a second actuator held by the support, the second actuator being used for performing the second actuation, wherein the second actuator includes a second output portion and a second drive source for moving the second output portion linearly along a second actuation axis, the second actuation axis being skew to the second axis and intersecting the first axis,
   wherein the lamp includes a first supporting portion that is located on the first axis and at a side of the lamp and a second supporting portion that is located on the first axis and at the other side of the lamp, the first supporting portion being supported by the support to be pivotable about the intersection point of the first axis and the second axis, the second supporting portion being joined to a movable joint member that is supported by the support to be movable along the second actuation axis,
   wherein the first output portion is joined, on the first actuation axis, to the lamp, so as to be capable of transmitting its own linear motion to the lamp, and
   wherein the second output portion is joined, on the second actuation axis, to the lamp, so as to be capable of transmitting its own linear motion to the lamp.

2. The lamp device according to claim 1, wherein the lamp is suspended from the support by means of the first supporting portion, and
   wherein the support includes a guide that guides movement of the movable joint member along the second actuation direction, while restricting movement of the movable joint member along the second axis.

3. The lamp device according to claim 1, wherein, at the second actuation, the movable joint member allows the second supporting portion to move relative to the movable joint member.

4. The lamp device according to claim 3, wherein the second supporting portion is shaped as a rod that extends along the first axis, and
   wherein the movable joint member has a joint hole, into which the second supporting portion is inserted, and, at the second actuation, the joint hole allows the second supporting portion to move relative to the movable joint member.

5. The lamp device according to claim 1, further comprising a joint member that pivotably holds the first output portion,
   wherein the first output portion is joined to the lamp by means of the joint member, and
   wherein, at the second actuation, the lamp allows the joint member to move relative to the lamp.

6. The lamp device according to claim 5, wherein the joint member is movable relative to the lamp along a direction that is perpendicular to the second axis and to the first actuation axis.

7. The lamp device according to claim 1, wherein the position of the first actuator is adjustable along a linear actuation direction of the first output portion, and
   wherein the position of the second actuator is adjustable along a linear actuation direction of the second output portion.

8. The lamp device according to claim 1, wherein the second output portion is releasable from the movable joint member by inclining the second actuator such that the second output portion moves in one direction that is perpendicular to the second actuation axis,
   wherein the support has a rear wall located rearward of the lamp, the rear wall having an attachment hole, the second actuator being insertable into the attachment hole, and the attachment hole allowing the second actuator to be inclined to release the second output portion from the movable joint member, and
   wherein the second actuator is inserted in the attachment hole when fixed to the rear wall.

9. The lamp device according to claim 1, wherein the first output portion is releasable from the lamp by inclining the first actuator such that the first output portion moves in one direction that is perpendicular to the first actuation axis,
   wherein the support has a rear wall located rearward of the lamp, the rear wall having an attachment hole, the first actuator being insertable into the attachment hole, and the attachment hole allowing the first actuator to be inclined to release the first output portion from the lamp, and
   wherein the first actuator is inserted in the attachment hole when fixed to the rear wall.

10. The lamp device according to claim 1, wherein each of the first and second actuators includes a motor, a gear member, and a rack member having rack teeth meshed with the gear member, the gear member being rotated when receiving rotational drive force of the motor, the rack member being moved linearly as the gear member rotates,
    wherein the gear member includes an actuating-side stopper and a disk-shaped gear meshed with the rack teeth, and
    wherein the rack member includes an actuated-side stopper, wherein, when the gear member is rotated by a predetermined angle that corresponds to a moving range of the rack member, the actuating-side stopper contacts the actuated-side stopper along the direction of rotation of the gear member.

11. The lamp device according to claim 10, wherein the actuating-side stopper is shaped as a column that has an outer diameter greater than that of the gear and extends along the rotational axis of the gear member, wherein one end face of the actuating-side stopper in the axial direction slides on a side surface of the rack member that extends along the moving direction of the rack member.

12. The lamp device according to claim 10, wherein the rack member includes a rack portion having rack teeth, and the actuated-side stopper is one of two actuated side stoppers that are formed at the ends of the rack portion with respect to the moving direction of the rack member.

13. The lamp device according to claim 10, wherein said gear is a first gear, the gear member being formed by integrating the first gear, a second gear that receives rotational drive force of the motor, and the actuating-side stopper, the actuating stopper being shaped as a column and having a cutout recess, wherein the second gear has a diameter larger than that of the first gear, wherein the actuating-side stopper is provided between the first gear and the second gear and has a pair contact surfaces, the contact surfaces defining the cutout recess and being perpendicular to the rotation direction of the gear member, and wherein the rack member includes, on a side of the rack teeth, a stopper recess extending in the same direction as the moving direction of the rack member, the actuating-side stopper being arranged in the stopper recess.

14. The lamp device according to claim 10, wherein the gear member has a first positioning hole that extends through the gear member along the direction of the rotation axis thereof, and wherein the rack member has a second positioning hole, wherein, when the gear member is arranged at a proper installment position with respect to the rack member, the second positioning hole is aligned with the first positioning hole as viewed in a direction of the rotational axis of the gear member.

* * * * *